(12) United States Patent
Wu et al.

(10) Patent No.: US 11,489,600 B2
(45) Date of Patent: Nov. 1, 2022

(54) MOBILE TERMINAL TESTING DEVICE AND MOBILE TERMINAL TESTING METHOD

(71) Applicant: ANRITSU CORPORATION, Kanagawa (JP)

(72) Inventors: Zhihui Wu, Kanagawa (JP); Takumi Nakamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/544,396

(22) Filed: Dec. 7, 2021

(65) Prior Publication Data
US 2022/0255641 A1  Aug. 11, 2022

(30) Foreign Application Priority Data
Feb. 8, 2021 (JP) .............................. JP2021-018371

(51) Int. Cl.
*H04B 17/29* (2015.01)
*H04B 17/17* (2015.01)
*H04B 17/00* (2015.01)

(52) U.S. Cl.
CPC ............. *H04B 17/29* (2015.01); *H04B 17/17* (2015.01)

(58) Field of Classification Search
CPC ..... H04B 17/29; H04B 17/17; H04B 17/0085
See application file for complete search history.

(56) References Cited

U.S. PATENT DOCUMENTS

| | | | | |
|---|---|---|---|---|
| 6,114,858 A | * | 9/2000 | Kasten | G01R 29/26 324/614 |
| 6,137,830 A | * | 10/2000 | Schneider | H04B 17/0085 375/228 |
| 7,271,575 B2 | * | 9/2007 | Pickerd | G01R 13/22 324/76.19 |
| 2004/0148580 A1 | * | 7/2004 | de Obaldia | H04B 17/29 714/715 |
| 2006/0012388 A1 | * | 1/2006 | Lin | H04W 24/00 324/754.08 |
| 2006/0274657 A1 | * | 12/2006 | Olgaard | H04L 43/00 370/235 |
| 2007/0098059 A1 | * | 5/2007 | Ives | H04B 17/15 375/224 |

(Continued)

OTHER PUBLICATIONS

3GPP Technical Specifications, Chapter 38.521-2, 7.3.2, Mar. 2021.

*Primary Examiner* — Dominic E Rego
(74) *Attorney, Agent, or Firm* — Pearne & Gordon LLP

(57) ABSTRACT

In the measurement device 1, a reception sensitivity test control unit 18 ends throughput measurement of a CC using a throughput measurement unit 18*b* in a case where an end determination unit 18*c*1 determines that any of a plurality of CCs has reached a measurement end condition, and calculates a total status obtained by integrating a determination result for each CC using a total status calculation unit 18*c*2 by performing each "PASS" or "FAIL" determination for a remaining CC. Since an output level variable setting unit 18*d* performs a process of setting a next output level for the CC that has not reached the measurement end condition based on the total status, a control is performed to continue a reception sensitivity test until all CCs reach a measurement end condition.

8 Claims, 17 Drawing Sheets

(56) References Cited

U.S. PATENT DOCUMENTS

| | | | |
|---|---|---|---|
| 2008/0293363 A1* | 11/2008 | Olgaard | H04B 17/29 455/67.7 |
| 2009/0085579 A1* | 4/2009 | Takeuchi | H03H 7/24 324/555 |
| 2009/0124252 A1* | 5/2009 | Jin | H04B 17/29 455/425 |
| 2010/0295533 A1* | 11/2010 | Kuga | G01R 23/20 324/76.39 |
| 2012/0122406 A1* | 5/2012 | Gregg | H04W 24/06 455/67.11 |
| 2012/0213112 A1* | 8/2012 | Olgaard | H04L 43/00 370/252 |
| 2012/0231744 A1* | 9/2012 | Gregg | H04B 17/309 455/67.12 |
| 2012/0231745 A1* | 9/2012 | Gregg | H04B 17/29 455/67.11 |
| 2014/0160955 A1* | 6/2014 | Lum | H04W 24/06 370/252 |
| 2014/0194069 A1* | 7/2014 | Liu | H04B 17/29 455/67.14 |
| 2016/0139179 A1* | 5/2016 | Ku | G01R 1/06772 324/755.07 |
| 2017/0078031 A1* | 3/2017 | Olgaard | H04B 17/17 |
| 2018/0027434 A1* | 1/2018 | Foegelle | H04B 7/0617 455/67.13 |
| 2018/0091335 A1* | 3/2018 | Schnizler | H04L 25/4917 |
| 2018/0115372 A1* | 4/2018 | Seward, IV | H04B 17/16 |
| 2018/0267096 A1* | 9/2018 | Lindell | G01R 31/2837 |
| 2019/0058535 A1* | 2/2019 | Karajani | H04B 17/0085 |
| 2020/0341052 A1* | 10/2020 | Barthel | G01R 13/0218 |
| 2021/0223300 A1* | 7/2021 | Huard | G10H 1/04 |
| 2021/0266243 A1* | 8/2021 | Petrovic | H04L 43/50 |
| 2022/0260662 A1* | 8/2022 | Anderson | H04B 17/102 |

* cited by examiner

FIG.10

| | CC1 | | | | | CC2 | | | | | CC3 | | | | | CC4 | | | | Comment |
|---|---|---|---|---|---|---|---|---|---|---|---|---|---|---|---|---|---|---|---|---|
| Step No. | PCC -Lvl | Tput(%) | PCC -J | pcc -step | PCC -OL | SCC1 -Lvl | Tput(%) | SCC1 -J | scc1 -step | SCC1 -OL | SCC2 -Lvl | Tput(%) | SCC2 -J | scc2 -step | scc2 -OL | SCC3 -Lvl | Tput(%) | SCC3 -J | scc3 -step | scc3 -OL | Lowest OL | |
| 1 | −80 | 85.29 | Fail | +2 | −78 | −80 | 83.84 | Fail | +2 | −78 | −80 | 15.24 | Fail | +2 | −78 | −80 | 15.37 | Fail | +2 | −78 | −78 | Since tput of SCC3 is low, step level is lowered using normal dichotomy. |
| 2 | −78 | 99.55 | Pass | −1 | | −78 | 99.52 | Pass | −1 | | −78 | 98.28 | Pass | −1 | | −78 | 97.86 | Pass | −1 | −78 | −78 | Same as above |
| 3 | −79 | 90.36 | Fail | +0.2 | | −79 | 89.89 | Fail | +0.2 | | −79 | 81.13 | Fail | +0.2 | | −79 | 9.4 | Fail | +0.5 | −79 | −79 | Although original set value of SCC2 is set as OL6=LowestPass-EL, setting of −78.5 is made since level of SCC3 is low. |
| 4 | −78.8 | 92.83 | Fail | +0.2 | | −78.8 | 92.74 | Fail | +0.2 | | −78.8 | 83.75 | Fail | +0.2 | | −78.8 | 9.18 | Fail | +0.25 | −78.5 | −78.8 | |
| 5 | −78.6 | 98.21 | Pass | | | −78.6 | 98.01 | Pass | | | −78.6 | 93.83 | Fail | +0.2 | −78.6 | −78.6 | 10.4 | Fail | +0.125 | −78.55 | −78.6 | Since step of SCC3 is smaller than EL, Measurement is performed after returning to value of EL. |
| 6 | | | | | | | | | | | −78.5 | 95.36 | Pass | | −78.4 | −78.5 | 20.73 | Fail | +0.2 | −78.475 | −78.475 Rounded to −78.5 | In range of EL in which difference between OL7 and OL2 of SCC3 is twice (−78−(−78.3))=0.3 EL: 0.2), CP Condition is satisfied, so that setting of OL8= LowestPass−EL is made |
| 7 | | | | | | | | | | | | | | | | −78.3 | 72.25 | Fail | CP | −78.3 | −78.3 | |
| 8 | | | | | | | | | | | | | | | | −78.2 | 89.27 | Fail | | −78.2 | | |

D11, D12, D13, D14, D21, D22, D31

| Number of measurements | OL(n) (dBm) | Throughput | Determination result based on determination condition | SL(n)(dB) (OL(n) − OL(n−1)) | Process of next output level | Next output level |
|---|---|---|---|---|---|---|
| 1 | −75 | PASS | NO | −10 (=SL0) | Level down A | OL(2) = OL(1) − \|SL(1)\| |
| 2 | −85 | PASS | YES | −10 | Level down B | OL(3) = OL(2) − 2EL |
| 3 | −85.4 | FAIL | − | −0.4 | Level up A | OL(4) = OL(3) + EL |
| 4 | −85.2 | PASS | − | +0.2 | End measurement since SL(4) < EL(= 0.2) | |

FIG. 11

| Search step | Output level of nonlinear, dBm | Output level of improved nonlinear, dBm | Throughput, % | comment |
|---|---|---|---|---|
| 1 | −75 | −75 | 100 | |
| 2 | −85 | −85 | 95.69 | |
| 3 | −95 | −85.4 | 92.62 | |
| 4 | −90 | −85.2 | 95.05 | |
| 5 | −85 | | | |
| 6 | −87.5 | | | |
| 7 | −86.25 | | | |
| 8 | −85.625 | | | |
| 9 | −85.3125 | | | |
| Total of steps = | 9 | 4 | | Improved rate = 2.25 |

FIG. 12

MOBILE TERMINAL TESTING DEVICE AND MOBILE TERMINAL TESTING METHOD

TECHNICAL FIELD

The present invention relates to a mobile terminal testing device and a mobile terminal testing method for performing a test of a mobile terminal, which is a device under test, by performing a reception sensitivity test in which a test signal including a plurality of component carriers (CCs) is transmitted and received to and from the device under test while changing an output level.

BACKGROUND ART

For a wireless terminal that has been developed in recent years and transmits and receives a radio signal corresponding to IEEE802.11ad, 5G cellular, and the like, in which a signal in a wide band of a millimeter wave band is used, a performance test is performed of measuring an output level and reception sensitivity of a transmitted radio wave determined for each communication standard with respect to a wireless communication antenna included in the wireless terminal, and determining whether or not a predetermined reference is satisfied.

For example, in a performance test in which a wireless terminal for a 5G New Radio (NR) system (hereinafter, referred to as a 5G wireless terminal) is used as a Device Under Test (DUT), an OTA test is performed using a radio anechoic box (OTA chamber) called a Compact Antenna Test Range (CATR) which is not affected by a surrounding radio wave environment.

For various tests, such as OTA tests, targeting 5G wireless terminals, for example, tests are obliged to be performed according to standards disclosed in Non-Patent Document 1.

For example, regarding a DUT reception sensitivity test for aggregating measurement results by executing an operation of receiving a test signal transmitted from a signal generator by the DUT (5G wireless terminal) and measuring reception sensitivity a plurality of times, a Section 7.3.2 of Chapter 38.521-2 of non-patent document 1 discloses regulation such as a minimum allowable output level [dB] of the test signal.

RELATED ART DOCUMENT

Patent Document

[Non-Patent Document 1] 3GPP Technical Specifications, Chapter 38.521-2, 7.3.2

DISCLOSURE OF THE INVENTION

Problem that the Invention is to Solve

In order to maintain an output level of a test signal as a value according to a standard described in Non-Patent Document 1, a mobile terminal testing device according to the related art, which can perform a reception sensitivity test of a DUT, generally adopts a method (refer to a test result display area 135b of a main screen 135a in FIG. 17) for performing sequential change (linear change) by a constant level as the number of measurements increases from an output level set in an initial reception sensitivity test.

Therefore, in the mobile terminal testing device according to the related art, a long time is taken to control the output level of the test signal transmitted from a signal generator to an output level (testable level) suitable for the reception sensitivity test of a mobile terminal, so that, as a result, a long time is required for the reception sensitivity test.

Furthermore, in recent years, for the mobile terminal, such as a 5G wireless terminal, it is proposed to adopt a Carrier Aggregation (CA) technology that uses a plurality of Component Carriers (CC) in different frequency bands in combination (in bundles) in order to support high-speed communication.

In the mobile terminal testing device that performs a test of the mobile terminal and that is capable of performing communication, in which a plurality of CCs are bundled, by the CA, it is necessary to perform the reception sensitivity test for each CC. In this case, as in a case where one carrier (carrier wave) is used as the test signal, a method is conceivable for applying a level setting method for linearly changing the output level by a constant level sequentially as the number of measurements increases for each CC.

According to the mobile terminal testing device according to the related art, to which the level setting method is applied, in a case where the reception sensitivity test is performed on all CCs, it is necessary to continuously perform measurement of a throughput of each CC until all CCs reach a throughput measurement end condition. Therefore, this type of test device according to the related art has a problem in that further longer time is taken for the reception sensitivity test than the case where one carrier is used as the test signal.

The present invention has been made to solve such a conventional problem, and an object of the present invention is to provide a mobile terminal testing device and a mobile terminal testing method capable of shortening the time required to end the reception sensitivity test of all the CCs bundled by the CA of the mobile terminal which adopts the CA.

Means for Solving the Problem

In order to solve the above problems, according to a first aspect of the present invention, there is provided a mobile terminal testing device, which performs a test of a mobile terminal (100) that is a device under test, including: a signal generator (21a) that generates a test signal; and reception sensitivity test execution means (18) for performing a reception sensitivity test of the device under test by setting an output level of the test signal for each time and transmitting and receiving the test signal between the signal generator and the device under test, in which the signal generator generates the test signal including a plurality of carriers, the reception sensitivity test execution means includes throughput measurement means (18b) for measuring a throughput of the plurality of carriers transmitted and received for each time, determination means (18c1) for determining whether or not a measured throughput value has reached a predetermined measurement end condition for each carrier, and integrated determination result calculation means (18c2) for, for each carrier that has not reached the measurement end condition, performing "PASS" or "FAIL" determination based on a comparison result of the measured throughput value and a predetermined threshold value, and calculating an integrated determination result obtained by integrating a result of each determination, and output level setting means (18e) for setting a next output level for the carrier that has not reached the measurement end condition based on the integrated determination result, and the reception sensitivity test is executed for each of the plurality of carriers, in a case where any of carriers reaches the measurement end condition, the throughput measurement of the carrier ends, and the reception sensitivity test is continued for the carrier that has not reached the measurement end condition until all of the plurality of carriers reach the measurement end condition.

With the configuration, the mobile terminal testing device according to the first aspect of the present invention can correspond to a test signal including the plurality of carriers, and, thereafter, in a case where any of the plurality of carriers reaches the measurement end condition, performs control so that the throughput measurement of the carrier is not performed, so that measurement time can be significantly shortened as compared with a case where the measurement of all the carriers is continued until the measurement of all the carriers is completed.

Further, in the mobile terminal testing device according to a second aspect of the present invention, the integrated determination result calculation means may compare the number of determination results for each carrier, and calculates the integrated determination result as "PASS" in a case of the number of FAIL≤the number of PASS and as "FAIL" in a case of the number of FAIL>the number of PASS.

With the configuration, the mobile terminal testing device according to the second aspect of the present invention can easily calculate a total status regardless of the number of carriers whose measurement has not been completed, so that it becomes easy to correspond to the reception sensitivity test using the test signal including the plurality of carriers.

Further, in the mobile terminal testing device according to a third aspect of the present invention, the output level setting means may set a level of a next output signal by a first level setting process (S12a) of lowering the output level by a step of an initial step level (SL0) from a previous output level (OL(n)) or a second level setting process (S12b) of lowering a level (2×EL) corresponding to twice an error tolerance level (EL) from the previous output level in a case where the integrated determination result is "PASS", and may set the level of the next output signal by a third level setting process (S13d) of raising a level (SL/2) corresponding to ½ of a previous step level (SL) from the previous output level or a fourth level setting process (13e) of raising a level (SL) corresponding to the previous step level from the previous output level in a case where the integrated determination result is "FAIL".

With the configuration, the mobile terminal testing device according to the third aspect of the present invention makes full use of the first level setting process, the second level setting process, the third level setting process, and the fourth level setting process, so that non-linear output level change setting is possible in consideration of the throughput of each carrier of the test signal including the plurality of carriers, and the measurement time can be shortened compared to a case where linear change setting is performed.

Further, in the mobile terminal testing device according to a fourth aspect of the present invention, the reception sensitivity test execution means may further include drop state determination means (18c3) for determining whether or not to be a dropped state to a preset proportion in a steep drop area related to a characteristic that a measurement result of the throughput drops steeply, for each carrier which has not reached the measurement end condition, and the output level setting means may perform, for each carrier which has not reached the measurement end condition, a setting process (S12, S13) of setting the output level for the carrier to be different from the previous output level according to the integrated determination result and the determination result of whether or not to be the dropped state by the drop state determination means, the setting process including a process (S12b, S13b) of performing level down or level up on the output level for the carrier with respect to the previous output level in units of a predetermined variation width (EL) in a case where it is determined to be the dropped state.

With the configuration, in the mobile terminal testing device according to the fourth aspect of the present invention, on the carrier whose measurement has not been completed, check of previous and current variation range is executed while performing level down or level up in units of the predetermined variation range (EL) of the output level in a state in which the measured throughput drops to the proportion in the steep drop area. As a result, compared to a case of continuing level down or level up on the output level with a step variation range simply derived from an initial step variation range, it is possible to reduce the number of transmissions and receptions, so that it is possible to reduce the measurement time.

Further, in order to solve the above problems, according to a fifth aspect of the present invention, there is provided a mobile terminal testing method using a mobile terminal testing device, which performs a test of a mobile terminal (100) that is a device under test and which includes a signal generator (21a) that generates a test signal including a plurality of carriers, and reception sensitivity test execution means (18) for performing a reception sensitivity test of the device under test by setting an output level of the test signal for each time and transmitting and receiving the test signal between the signal generator and the device under test, the mobile terminal testing method including: a measurement step (S2) of measuring a throughput of the plurality of carriers transmitted and received for each time; a determination step (S3) of determining whether or not a measured throughput value has reached a predetermined measurement end condition for each carrier whose throughput has been measured; an integrated determination result calculation step (S9) of, for each carrier that has not reached the measurement end condition, performing "PASS" or "FAIL" determination based on a comparison result of the measured throughput value and a predetermined threshold value, and calculating an integrated determination result obtained by integrating a result of each determination; and an output level setting step (S10) of setting a next output level for the carrier that has not reached the measurement end condition based on the integrated determination result, in which the reception sensitivity test is executed for each of the plurality of carriers, in a case where any of carriers reaches the measurement end condition, the throughput measurement of the carrier ends, and the reception sensitivity test is continued for the carrier that has not reached the measurement end condition until all of the plurality of carriers reach the measurement end condition.

With the configuration, the mobile terminal testing method according to the fifth aspect of the present invention can correspond to a test signal including the plurality of carriers, and, thereafter, in a case where any of the plurality of carriers reaches the measurement end condition, performs control so that the throughput measurement of the carrier is not performed, so that measurement time can be significantly shortened as compared with a case where the measurement of all the carriers is continued until the measurement of all the carriers is completed.

Advantage of the Invention

The present invention can provide a mobile terminal testing device and a mobile terminal testing method capable of shortening time required to end a reception sensitivity test of all CCs bundled by a CA of a mobile terminal which adopts the CA.

BRIEF DESCRIPTION OF THE DRAWINGS

FIGS. 5A and 5B are diagrams showing total spherical scanning images of a device under test in an OTA chamber of the measurement device according to the embodiment of the present invention, in which FIG. 5A shows a disposition mode of the device under test with respect to a center of a spherical coordinate system, and FIG. 5B shows a distribution mode of angular sample points PS in a spherical coordinate system.

FIGS. 9A and 9B are flowcharts showing details of a process in step S12 of FIG. 8, in which FIG. 9A shows a level down process (A) and FIG. 9B shows a level down process (B).

FIG. 10 is a table diagram showing an example of an output level and related parameters set for each CC by the output level variable setting control using a test signal including four CCs along the flow shown in FIG. 7.

FIG. 11 is a table diagram showing a relationship between the number of measurements, a measurement value of each of the output level of the test signal and a throughput which are used to verify measurement time shortening actions in the measurement device according to the embodiment of the present invention.

FIG. 12 is a table diagram showing a relationship between the number of measurements and a measurement value of each of the output level of the test signal and a throughput related to the reception sensitivity test of the DUT of the measurement device according to the embodiment of the present invention.

BEST MODE FOR CARRYING OUT THE INVENTION

Hereinafter, an embodiment of a mobile terminal testing device and a mobile terminal testing method according to the present invention will be described with reference to the accompanying drawings.

Figure 1:
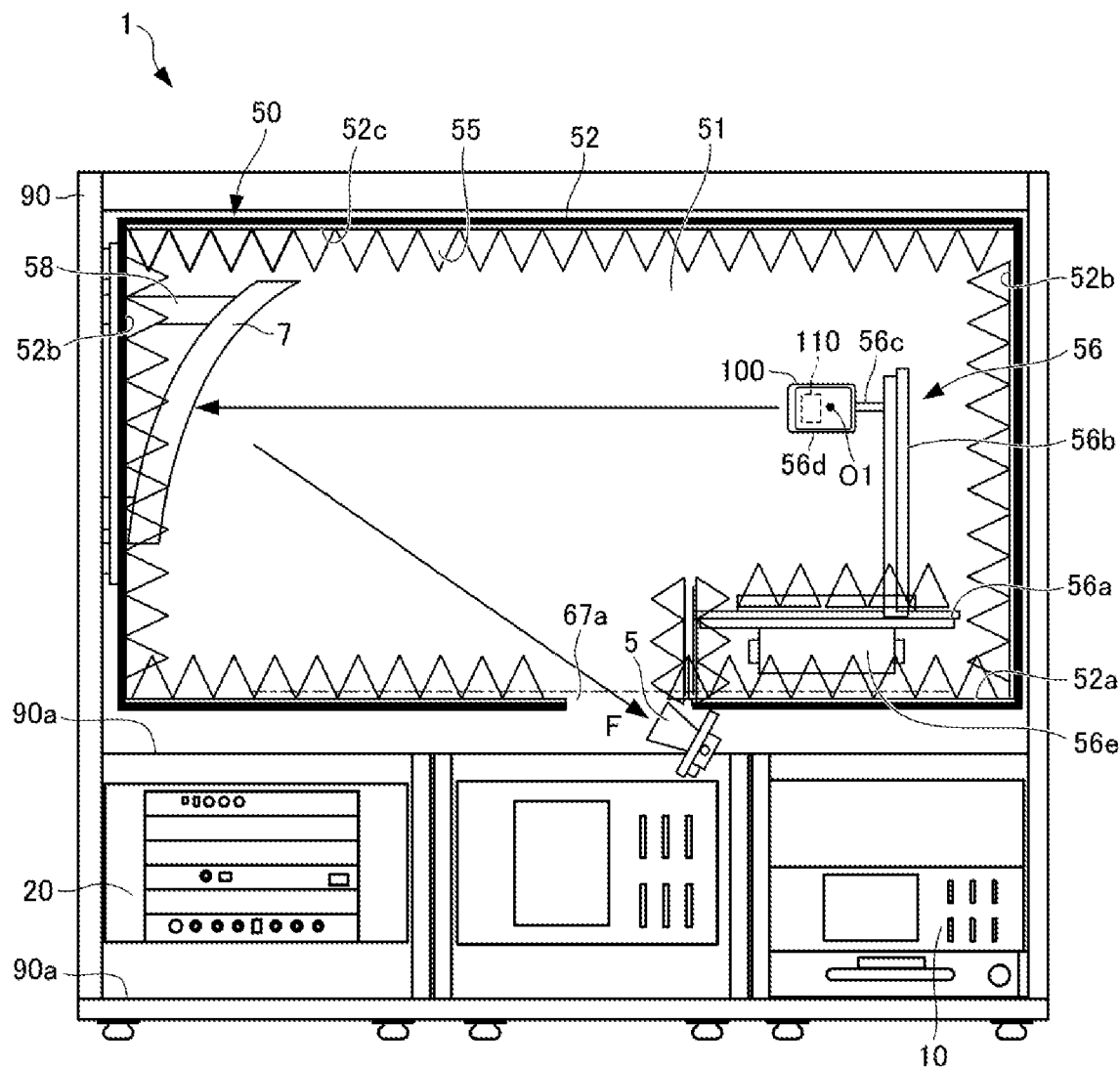
FIG. 1 is a diagram showing a schematic configuration of an entire measurement device according to an embodiment of the present invention.
Figure 2:
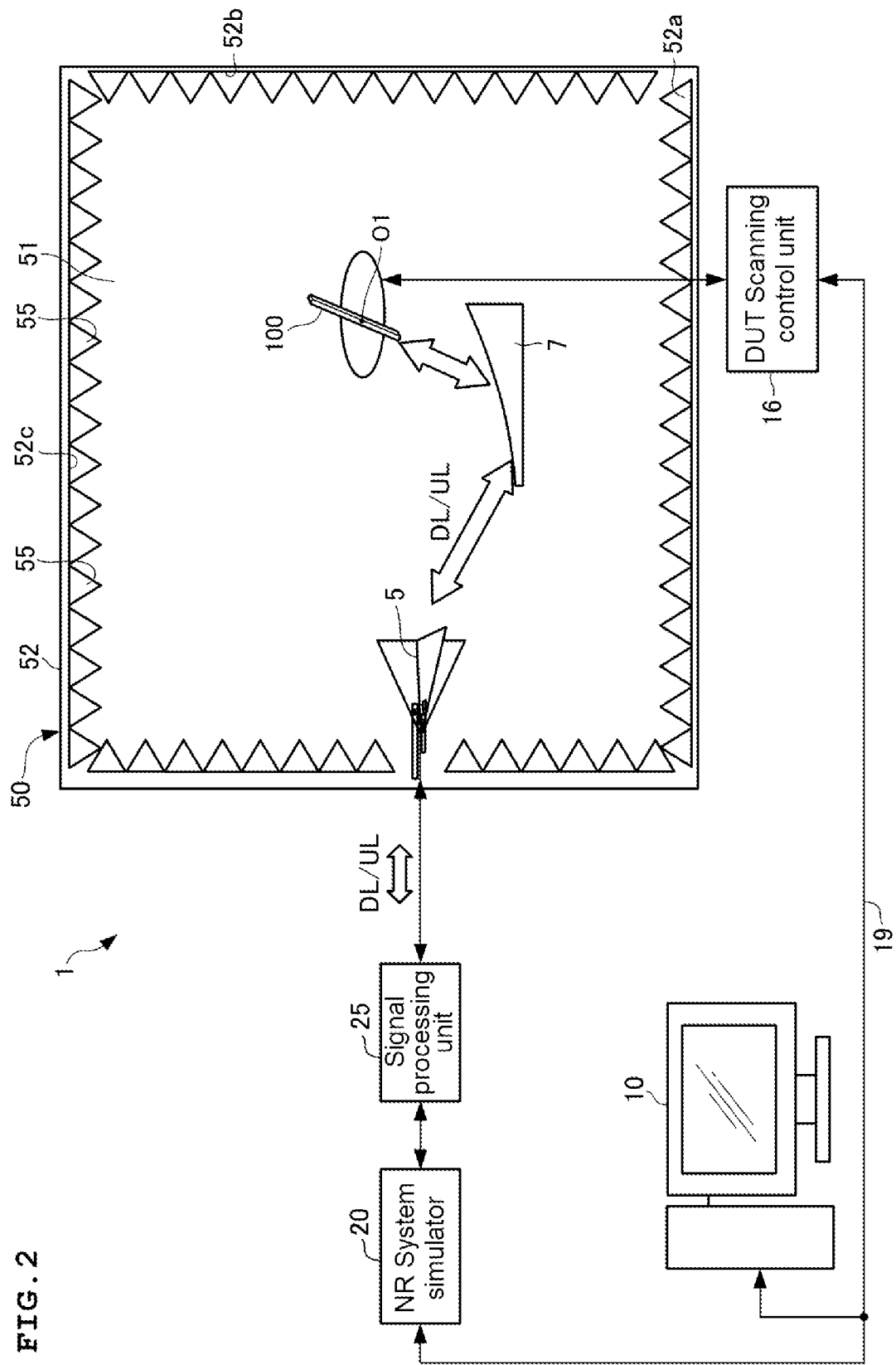
FIG. 2 is a block diagram showing a functional configuration of the measurement device according to the embodiment of the present invention.

First, a configuration of a measurement device 1 according to the embodiment of the present invention will be described with reference to FIGS. 1 to 4. The measurement device 1 constitutes the mobile terminal testing device of the present invention. The measurement device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measurement device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, and the OTA chamber 50 is mounted on each rack 90a of the rack structure 90.

As shown in FIG. 2, the measurement device 1 according to the present embodiment includes the integrated control device 10, the NR system simulator 20, a signal processing unit 25, and the OTA chamber 50.

For the configuration, here, the OTA chamber 50 will be described first for convenience. As shown in FIGS. 1 and 2, the OTA chamber 50 includes, for example, a metal housing main body 52 having a rectangular internal space 51, and accommodates a DUT 100 having an antenna 110, a test antenna 5, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, in the OTA chamber 50, each element (the DUT 100, the test antenna 5, the reflector 7, and the DUT scanning mechanism 56) disposed in the internal space 51 has an enhanced function of regulating intrusion of radio waves from the outside and radiation of the radio waves to the outside. In this way, the OTA chamber 50 realizes a radio anechoic box having the internal space 51 that is not affected by a surrounding radio wave environment. The radio anechoic box used in the present embodiment is, for example, an Anechoic type.

Among those accommodated in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1×EV-DO, TD-SCDMA, or the like), wireless LAN (IEEE 802.11b/g/a/n/ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, 5G NR communication standard. The DUT 100 is capable of transmitting and receiving the radio signal based on a Carrier Aggregation (CA) technology that bundles a plurality of CCs using the antenna 110. Examples of the CCs which are bundled include PCC, SCC1, SCC2, SCC3 (refer to FIG. 10) and the like. The DUT 100 constitutes a device under test, that is, the mobile terminal in the present invention.

In the internal space 51 of the OTA chamber 50, the DUT 100 is held by a partial mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5A and 5B and FIG. 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIG. 3) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIG. 3) capable of rotating around the roll axis (a rotation axis in a horizontal direction).

Figure 3:
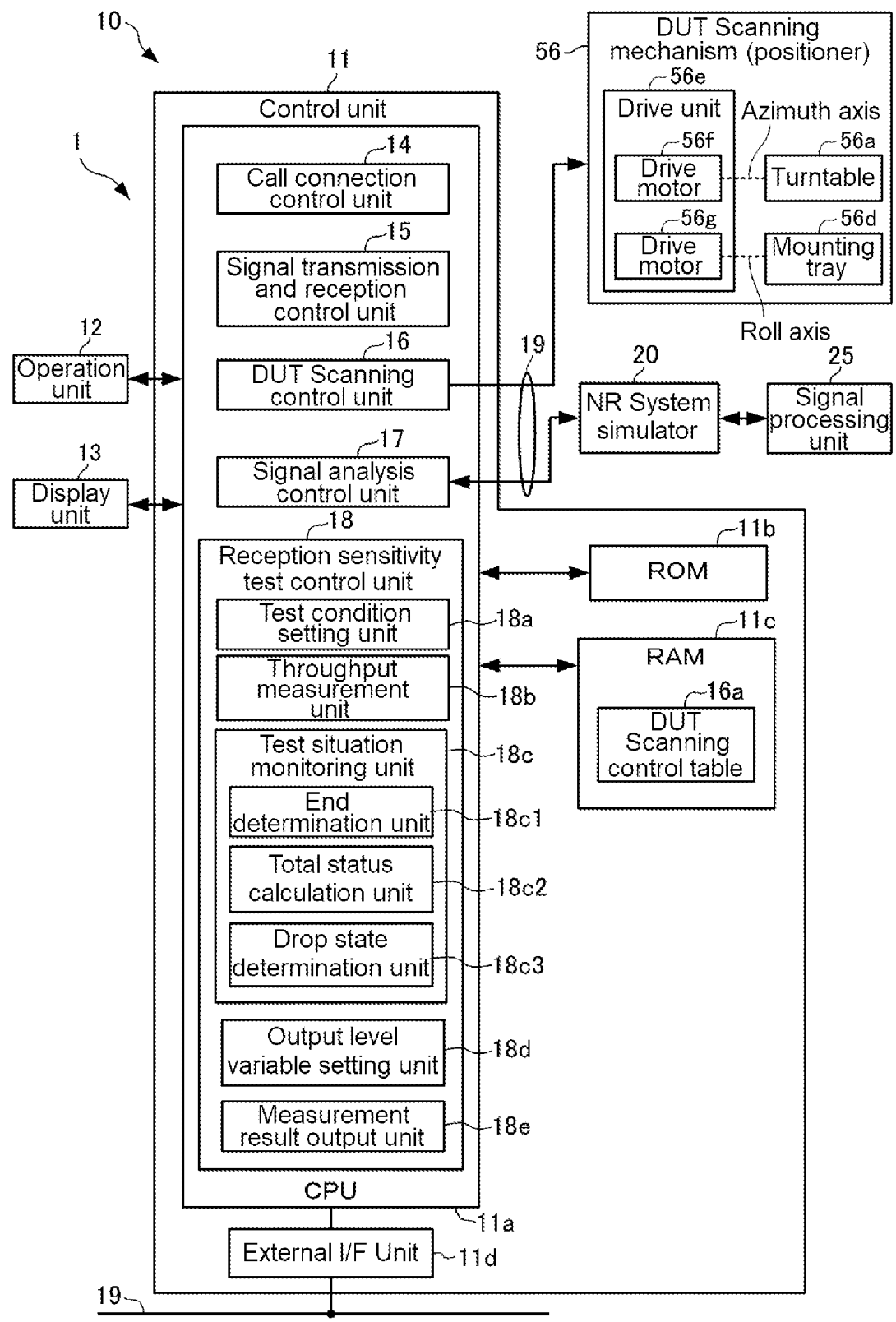
FIG. 3 is a block diagram showing functional configurations of an integrated control device and a controlled element thereof in the measurement device according to an embodiment of the present invention.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis in respective rotation direction thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3).

Figure 5A:
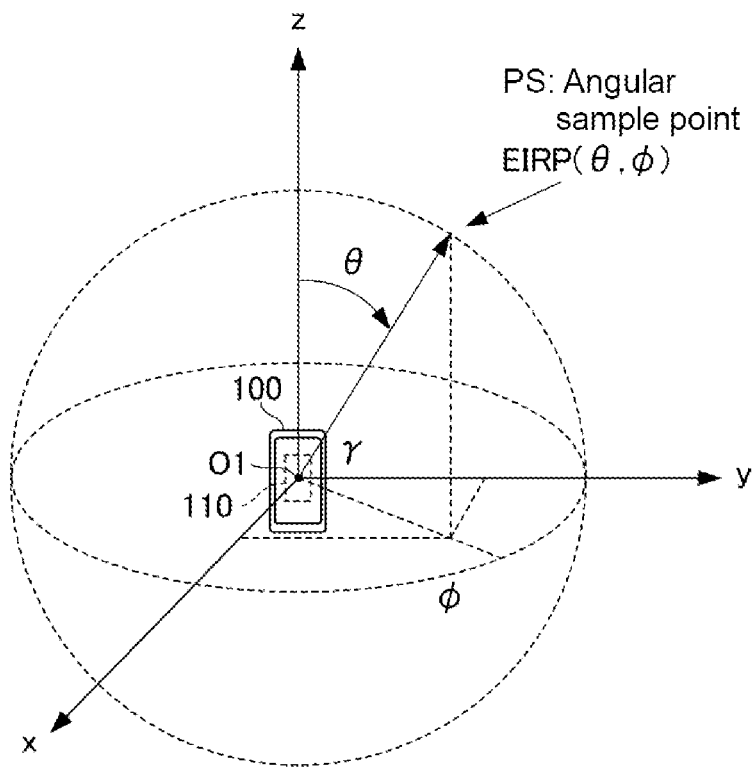
Figure 5B:
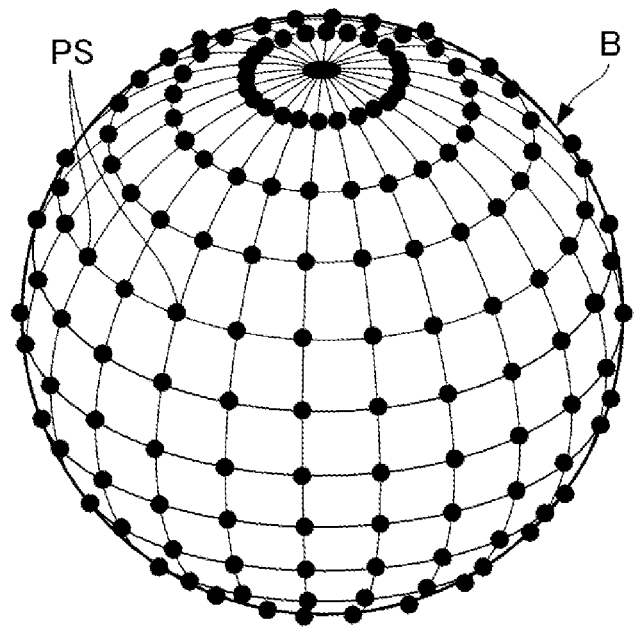

The DUT scanning mechanism 56 performs total spherical scanning which sequentially changes a posture of the DUT 100 to a state where the antenna 110 faces all orientations of a surface of the sphere while assuming that the DUT 100 mounted (held) on the mounting tray 56d is disposed, for example, at a center O1 of the sphere (refer to a sphere B in FIGS. 5A and 5B). Control of the DUT scanning in the DUT scanning mechanism 56 is performed by a DUT scanning control unit 16 which will be described later.

The test antenna 5 is attached to a required position on the bottom surface 52a of the housing main body 52 of the OTA chamber 50 by using an appropriate holder (not shown). The position to which the test antenna 5 is attached is a position at which visibility from the reflector 7 can be secured via an opening 67a provided on the bottom surface 52a. The test antenna 5 uses a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that has received the test signal. The test antenna 5 is disposed so that a light reception surface thereof becomes a focal position F of the reflector 7. The reflector 7 is not always required in a case where the test antenna 5 can be disposed so that the light reception surface thereof faces the DUT 100 and appropriate light reception can be performed.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the light reception surface of the test antenna 5.

Subsequently, configurations of the integrated control device 10 and the NR system simulator 20 will be described.

As shown in FIG. 2, the integrated control device 10 is communicably connected to the NR system simulator 20 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20 and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measurement device 1, and performs comprehensive control on the NR system simulator 20, and the signal processing unit 25 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20, the signal processing unit 25, and the drive unit 56e of the DUT scanning mechanism (biaxial positioner) 56 via the network 19. The operation unit 12 and the display unit 13 are connected to the input and output port. The operation unit 12 is a functional unit for inputting various information such as commands, and the display unit 13 is a functional unit for displaying various information such as an input screen and measurement results of the various information.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, a reception sensitivity test control unit 18. The call connection control unit 14, the signal transmission and reception control unit 15, the DUT scanning control unit 16, the signal analysis control unit 17, and the reception sensitivity test control unit 18 are also realized by executing a predetermined program stored in the ROM 11b in the work area of the RAM 11c by the CPU 11a.

The call connection control unit 14 drives the test antenna 5 via the NR system simulator 20 and the signal processing unit 25 to transmit and receive a control signal (radio signal) to and from the DUT 100, thereby performing control to establish a call (a state where the radio signal can be transmitted and received) between the NR system simulator 20 and the DUT 100.

The signal transmission and reception control unit 15 performs a control of monitoring a user operation in the operation unit 12, transmitting a signal transmission command to the NR system simulator 20 after the call is established through call connection control, by being triggered with a predetermined measurement start operation related to the measurement of transmission and reception characteristics of the DUT 100 by the user, and transmitting the test signal from the NR system simulator 20 via the test antenna 5, and a control of transmitting a signal reception command and receiving the signal under measurement via the test antenna 5.

The DUT scanning control unit 16 drives and controls the drive motors 56f and 56g of the DUT scanning mechanism 56 to perform total spherical scanning of the DUT 100 mounted on the mounting tray 56d of the DUT mounting portion 56c. In order to realize the control, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

The signal analysis control unit 17 captures a radio signal, which is related to the NR or the LTE and is received by the test antenna 5 in a case where the total spherical scanning of the DUT 100 is performed, via the NR system simulator 20 and the signal processing unit 25, and performs an analysis process (measurement process) on the radio signal as a signal of a designated measurement item.

The reception sensitivity test control unit 18 executes a reception sensitivity test of receiving the test signal, which is transmitted from the signal generation unit 21a of the NR system simulator 20, by the DUT 100 and measuring reception sensitivity a plurality of times, and performs control to aggregate measurement results of the reception sensitivity test, which is executed the plurality of times, as test results. The signal generation unit 21a has a functional configuration capable of generating the test signal including a plurality of CCs (refer to FIG. 10). The reception sensitivity test control unit 18 constitutes reception sensitivity test execution means of the present invention.

As shown in FIG. 3, the reception sensitivity test control unit 18 includes a test condition setting unit 18a, a throughput measurement unit 18b, a test situation monitoring unit 18c, an output level variable setting unit 18d, and a measurement result output unit 18e.

The test condition setting unit 18a is a functional unit for setting a test condition of the reception sensitivity test. The test condition set by the test condition setting unit 18a includes an initial step level SL0, a starting output level OL0, an error tolerance level (error tolerance of boundary level) EL, and a connection drop determination threshold value (connection drop threshold) DT, and the like. The initial step level SL0 indicates an initial value of a step variation range of an output level of the test signal which is changed stepwise in a case of the reception sensitivity test. The starting output level OL0 indicates an output level of the DUT 100 (an output level in a case of first transmission and reception) in a case of starting the reception sensitivity test. The error tolerance level EL indicates the variation range (predetermined value) between previous and current output levels of a predetermined test signal for determining whether or not to continue the reception sensitivity test on a next output level. The connection drop determination threshold value DT is a set value of a bottom value which causes drop of call connection (call drop) in a case where a value is lower than the value. In an algorithm shown in FIG. 8, the output level is lowered by a large step. Therefore, in a case where the process proceeds any further, call drop occurs, so that a threshold value which does not lower the output level is necessary. The value can be preset by the user. The test condition setting unit 18a may be configured to make various settings related to the plurality of CCs.

The throughput measurement unit 18b is a functional unit for measuring a throughput related to reception capacity of the DUT 100 for each reception sensitivity test. For example, a configuration may be provided in which the throughput measurement unit 18b transmits a transmission rate to the DUT 100 in accordance with the transmission of the test signal, and, thereafter, the DUT 100 measures the throughput from the received transmission rate in accordance that a reception result (received transmission rate) of the test signal is notified to the NR system simulator 20. In the present embodiment, the throughput measurement unit 18b has a configuration for performing throughput measurement for each CC received from the DUT 100 in response to transmission and reception of a test signal including the plurality of CCs. The throughput measurement unit 18b constitutes throughput measurement means of the present invention.

The test situation monitoring unit 18c includes an end determination unit 18c1, a total status calculation unit 18c2, and a drop state determination unit 18c3. The end determination unit 18c1 is a functional unit for determining whether or not the measured throughput value has reached a predetermined measurement end condition for each CC whose throughput is measured by the throughput measurement unit 18b. The predetermined measurement end condition is, for example, a state in which the measured throughput value is equal to or less than a preset error tolerance level EL. The end determination unit 18c1 constitutes determination means of the present invention.

During the reception sensitivity test, the total status calculation unit 18c2 is a processing functional unit for performing "PASS" or "FAIL" determination based on a comparison result between the measured throughput value and the predetermined throughput threshold value for each CC that has not reached the measurement end condition, and calculating an integrated determination result that is obtained by integrating a result of the pass or fail determination for each CC as a total status. The total status calculation unit 18c2 constitutes integrated determination result calculation means of the present invention.

The drop state determination unit 18c3 has a function of determining whether or not to be a state dropped to a preset proportion in the steep drop area related to the characteristic (refer to FIG. 15), in which the measurement result of the throughput by the throughput measurement unit 18b drops steeply, for each CC. In order to realize the function, for example, the test condition setting unit 18a presets a determination condition for determining whether or not the measurement result of the throughput drops to a certain proportion in the steep drop area. The drop state determination unit 18c3 determines whether or not to be the dropped state according to whether or not the measured throughput is in the steep drop area indicated by the determination condition. As the determination condition for determining whether or not the throughput measurement result is in the dropped state, for example, an example is provided in which a range which exceeds 95% and is equal to or less than 99% is set in a case where a throughput value, which is measured by the throughput measurement unit 18b through first test signal transmission and reception, is set to 100%. As a result, in a case where the measured throughput is in the set range, it is possible to determine the dropped state, and, in a case of a proportion higher than the range, it is possible to determine that the dropped state is not made. Here, the determination condition is not limited to a case where the throughput value, which is measured with the first test signal transmission and reception, is set to 100% (reference value) as described above and the range of the proportion, which exceeds 95% and is equal to or less than 99% with respect to the reference value, is set. Another range of a proportion with respect to the reference value may be set. The drop state determination unit 18c3 constitutes drop state determination means of the present invention.

The output level variable setting unit 18d is a functional unit for, according to a comparison result between a measurement result of the throughput by the throughput measurement unit 18b and a predetermined threshold value (throughput threshold value) set in advance, performing variable setting so that an output level of a test signal in a next reception sensitivity test is in an ascending (level up) or descending (level down) direction, that is, the output levels of the test signals between the reception sensitivity tests corresponding to before and after number of times become different. The output level variable setting is performed for each of the plurality of CCs. The output level variable setting unit 18d constitutes output level setting means of the present invention.

The measurement result output unit 18e is a functional unit for proceeding to the next reception sensitivity test (throughput measurement) in a case where a test result variation range between a test result (measurement result of the throughput) of a current reception sensitivity test using the test signal, which has an output level after the variable setting, and a test result of a previous reception sensitivity test exceeds a range of a variation range (EL) set by the test condition setting unit 18a, and outputs the test result in a case where the test result variation range is in the variation range (EL). The control to output the test result is performed for each of the plurality of CCs.

Figure 4:
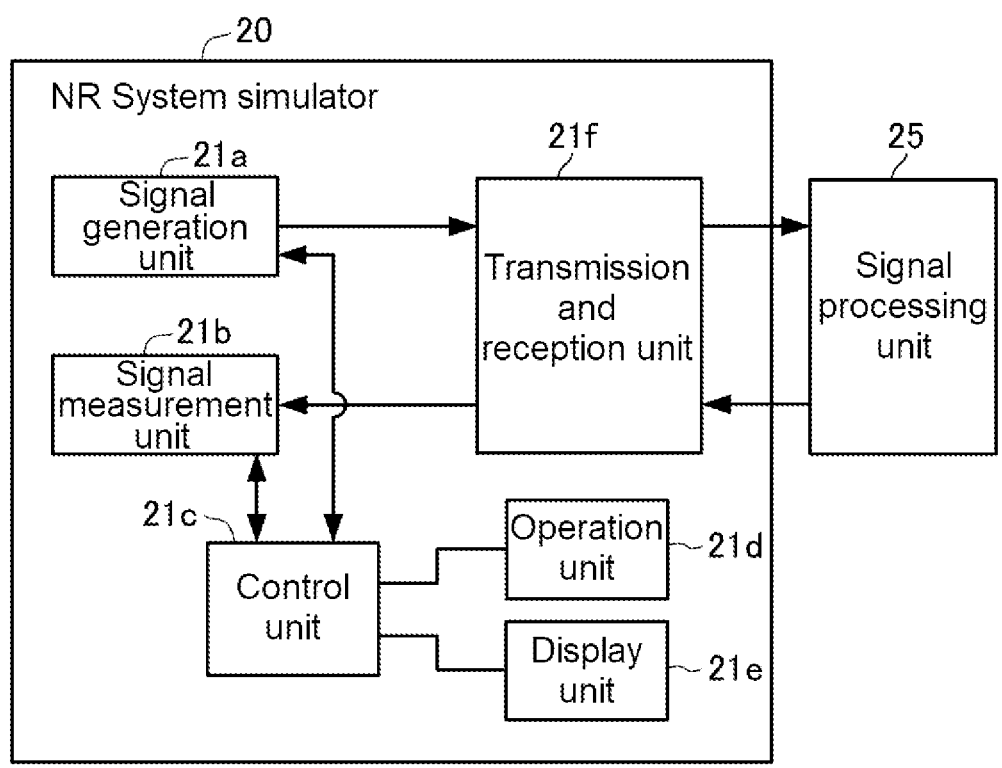
FIG. 4 is a block diagram showing a functional configuration of an NR system simulator in the measurement device according to the embodiment of the present invention.

As shown in FIG. 4, the NR system simulator 20 includes a signal generation unit 21a, a transmission and reception unit 21f, a signal measurement unit 21b, a control unit 21c, an operation unit 21d, and a display unit 21e.

The signal generation unit 21a generates a signal (baseband signal) that becomes a source of the test signal. The transmission and reception unit 21f functions as an RF unit that generates the test signal corresponding to a frequency of each communication standard from the signal generated by the signal generation unit 21a and sends the generated test signal to the signal processing unit 25, and restores the baseband signal from the signal under measurement which is sent from the signal processing unit 25. The signal measurement unit 21b performs measurement process of the signal under measurement based on the baseband signal restored by the transmission and reception unit 21f. The signal generation unit 21a is made to generate the test signal including the plurality of CCs. The signal generation unit 21a constitutes a signal generator of the present invention.

The control unit 21c comprehensively controls each of the functional units including the signal generation unit 21a, the signal measurement unit 21b, the transmission and reception unit 21f, the operation unit 21d, and the display unit 21e. The operation unit 21d is a functional unit for inputting various information such as commands, and the display unit 21e is a functional unit for displaying various information such as an input screen and measurement results of the various information.

In the measurement device 1 having the above-described configuration, the DUT 100 is mounted on the mounting tray 56d of the DUT scanning mechanism 56 (biaxial positioner) in the internal space 51 of the OTA chamber 50, and it is possible to measure the measurement item, such as EIRP-CDF, EIS-CDF, or TRP, related to the radio signal of the DUT 100 while rotating the DUT 100 in biaxial (azimuth axis and roll axis) directions (while changing an angle of the positioner) for each mounting tray 56d.

Here, control (total spherical scanning) of an angle of the DUT 100 by changing the angle of the biaxial positioner, which is required in a case of measuring each of the measurement items described above, will be described with reference to FIGS. 5A and 5B and FIG. 6.

Generally, related to measurement of radiated power targeting the DUT 100, an Equivalent Isotropic Radiated Power (EIRP) and a method for measuring Total Radiated Power (TRP) are known. The EIRP is, for example, a power value measured at each measurement point (θ, φ) in a spherical coordinate system (r, θ, φ) shown in FIG. 5A. On the other hand, the TRP is obtained by measuring the EIRP in all orientations of the spherical coordinate system (r, θ, φ), that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

In the present embodiment, the number of divisions Nθ and Nφ for calculating the total radiated power (TRP) is set to, for example, 12, respectively. As a result, in the present embodiment, the number of angular samples (N) is obtained as N=132 (=(12−1)×12). 132 angular sample points PS obtained as above are located as shown in FIG. 5B in a case where represented on a surface of the sphere B.

In the measurement device 1 according to the present embodiment, as shown in FIG. 5B, the EIRP is measured at positions of 132 points equidistant from the reference point of the spherical coordinate system (r, θ, φ), and, further, the EIRP is added at positions of all the point. Further, based on a result of addition of each EIRP, that is, a total sum of the EIRP at all the angular sample points PS of 132 points, the total radiated power (TRP) of the DUT 100 is obtained.

In a case where TRP measurement is performed, the integrated control device 10 drives and controls the DUT scanning mechanism 56 to perform the total spherical scanning of the DUT 100. In the total spherical scanning of the DUT 100, the integrated control device 10 rotationally drives the turntable 56a around the azimuth axis while repeatedly driving/non-driving the drive motor 56f, and rotationally drives the mounting tray 56d around the roll axis while repeatedly driving/non-driving the drive motor 56g. Here, the integrated control device 10 performs control so that the drive motor 56f and the drive motor 56g are non-driven at each timing in which the antenna surface of the antenna 110 faces one angular sample point PS. By controlling the total spherical scanning of the DUT 100, the DUT 100 mounted on the mounting tray 56d is rotationally driven around the reference point so that the antenna surface of the antenna 110 sequentially faces (orients) all the angular sample points PS of the sphere B while the antenna 110 is held at a position of the reference point which is the center of the sphere B that regulates the spherical coordinate system (r, θ, φ).

Figure 6:
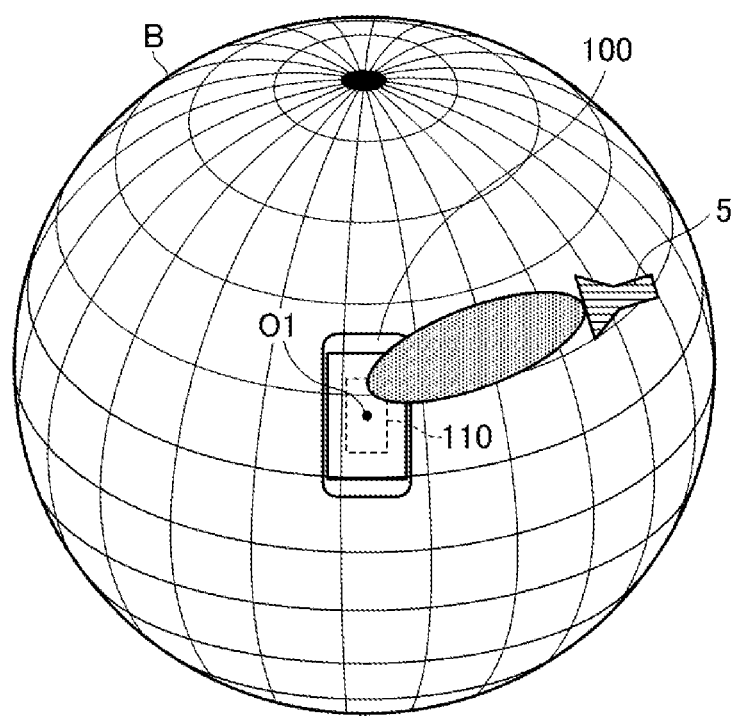
FIG. 6 is a diagram explaining a disposition mode of a test antenna 5 in the OTA chamber of the measurement device according to the embodiment of the present invention using the spherical coordinate system (r, θ, φ) shown in FIGS. 5A and 5B.

As shown in FIG. 6, the test antenna 5 is disposed at a position of a specific angular sample point PS (one point) in the spherical coordinate system (r, θ, φ). In the above-described total spherical scanning, the DUT 100 is driven (scanned) so that the antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, a signal under measurement that is received via the test antenna 5.

In the integrated control device 10, in accordance that the DUT 100 is scanned so as to pass through each angular sample point PS in a φ direction while maintaining a certain angle of θ in the spherical coordinate system (r, θ, φ) shown in FIG. 5B, the NR system simulator 20 is driven to generate the test signal by the signal generation unit 21a and the transmission and reception unit 21f, and the test signal is transmitted from the test antenna 5 via the signal processing unit 25. Here, in a case where the DUT 100 receives the test signal at the antenna 110, the DUT 100 sends out a response signal corresponding to the reception of the test signal.

The integrated control device 10 further drives the NR system simulator 20 so that a signal, which is transmitted by the DUT 100 in response to the reception of the test signal and is received by the test antenna 5, is received by the signal measurement unit 21b as the signal under measurement from the signal processing unit 25 via the transmission and reception unit 21f. Further, the integrated control device 10 drives and controls the signal measurement unit 21b so as to perform signal processing related to the measurement of the EIRP based on the received signal under measurement. In a case where the measurement control of the EIRP is performed in accordance with the total spherical scanning of the DUT 100 which passes through all the angular sample points PS by changing the angle of θ, it is possible to measure the EIRP for all the angular sample points PS of the spherical coordinate system (r, θ, φ) to correspond to NR in the NR system simulator 20. Further, the integrated control device 10 can obtain the TRP which is the total sum of the EIRP measurement values for all the angular sample points PS.

Further, the integrated control device 10 has an output level control function of adjusting the output level (power level) of the test signal in the NR system simulator 20 to an appropriate level regulated by, for example, the 3GPP standard before performing a performance test of the DUT 100, which is performed while changing an angle of the biaxial positioner (DUT scanning mechanism 56) in the OTA chamber 50, specifically, for example, measurement of measurement items such as EIRP-CDF, EIS-CDF, and TRP. With the output level control function, the output level of the test signal, at which the DUT 100 can exhibit maximum ability in a case of the measurement of each of the items, is searched. Therefore, the above-described output level control function by the NR system simulator 20 can be regarded as a control function related to the reception sensitivity test for searching for the reception sensitivity for the DUT 100. The control function related to the reception sensitivity test is realized by the reception sensitivity test control unit 18 provided in the control unit 11 of the integrated control device 10.

(Method for Reducing Time of Reception Sensitivity Test)

In the integrated control device 10, the reception sensitivity test control unit 18 controls the reception sensitivity test of the DUT 100 by transmitting and receiving the test signal a plurality of times between the signal generation unit 21a of the NR system simulator 20 and the DUT 100. In the control, a throughput is measured for each CC according to the transmission and reception of the test signal at each time during the reception sensitivity test so that each CC is converged to an output level, at which an appropriate throughput value (measurement result) is obtained, while performing level down or level up on the output level of the test signal according to the comparison result between the throughput measurement value and the throughput threshold value for each CC.

Figure 17:
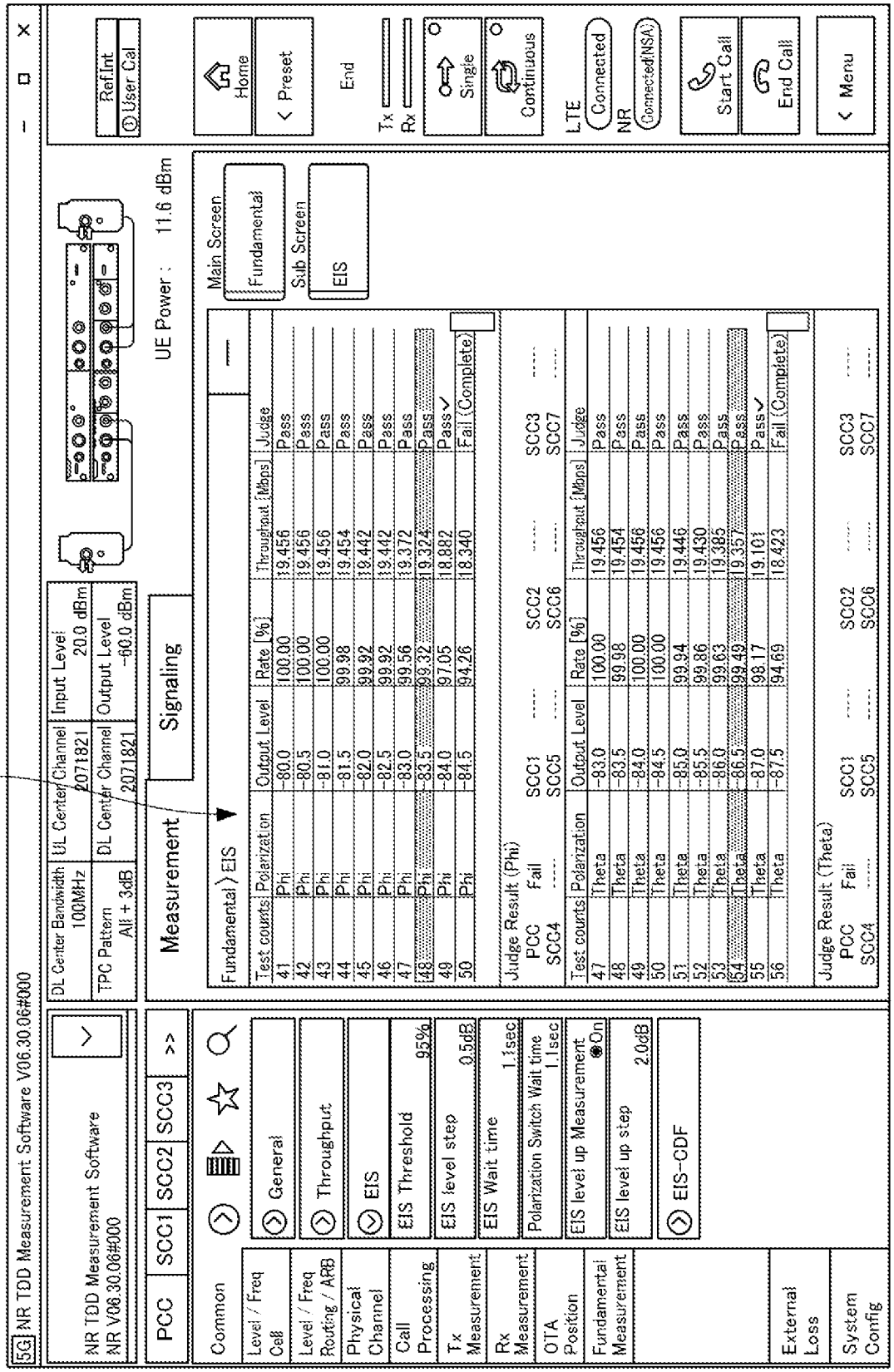
FIG. 17 is a diagram showing a display example of a reception sensitivity test result of a DUT based on the output level variable setting control of an output level of a test signal according to the related art.

As an example of a method for reducing a test time of the reception sensitivity test, a method is conceivable for performing control so that the output level is non-linearly fluctuated while repeatedly performing the level down or level up on the output level of the test signal without performing sequential change (linear change) by a constant level as the number of measurements increases from an initially set output level (refer to a test result display area 135b of FIG. 17).

Figure 13:
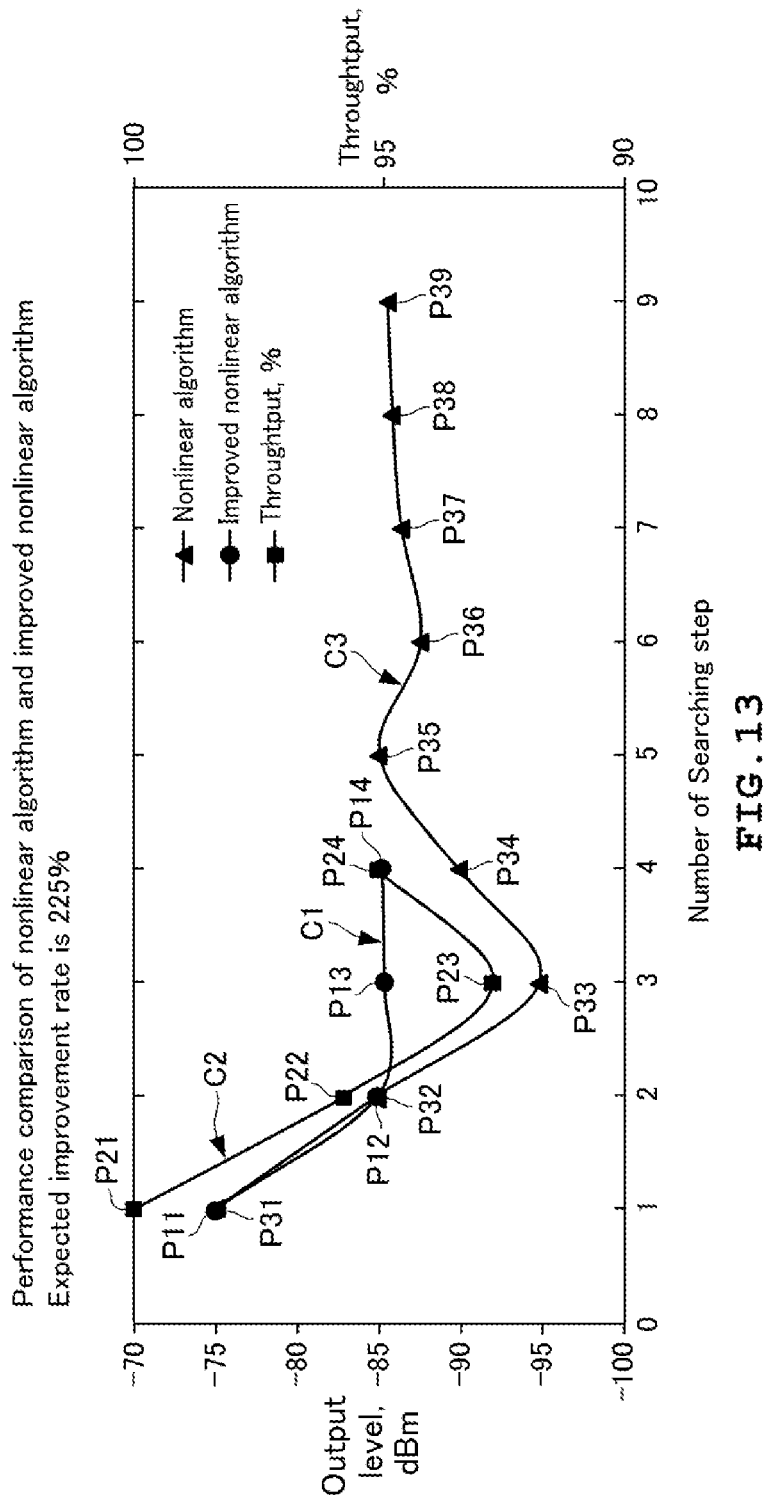
FIG. 13 is a graph showing the relationship between the number of measurements and the measurement value of each of the output level of the test signal and the throughput related to the reception sensitivity test of the DUT of the measurement device according to the embodiment of the present invention.

The measurement device 1 according to the present embodiment is premised that the output level of the test signal related to the reception sensitivity test of the DUT 100 is non-linearly controlled, and a relationship between the number of measurements related to the control and each of the measurement values of the output level of the test signal and throughput is shown as a table diagram of FIG. 12 and a graph of FIG. 13.

In the table diagram shown in FIG. 12, first and third to fifth columns from the left show data examples of test signal output level control according to the present embodiment. Further, in the table diagram, the first and second columns from the left show data examples of existing test signal output level control in the sense of being compared with the present embodiment. Similarly, in the graph shown in FIG. 13, graphs corresponding to the data examples of the test signal output level control according to the present embodiment in FIG. 12 are shown using reference numeral C1 (graph showing a relationship between the number of measurements and the output level) and reference numeral C2 (graph showing a relationship between the number of measurements and throughput), and a graph corresponding to the data example of the existing test signal output level control in FIG. 12 is shown using reference numeral C3 (graph showing the relationship between the number of measurements and the output level).

Focusing on the data examples in the first and second columns from the left of the table diagram shown in FIG. 12 and the characteristic C3 of the graph shown in FIG. 13, in the existing test signal output level control, for example, the variable level control is performed in a pattern in which the output level of the test signal is sequentially lowered by 10 dB intervals for each one measurement from first to third measurements, and the output level is sequentially raised or lowered by half the previous level after fourth measurement. Further, until a test end condition (refer to step S31 in FIG. 8) in which a difference from the previous output level is less than the error tolerance level EL set in advance is satisfied, a total of nine steps, which are shown using P31 to P39 in FIG. 11, are increased as the number of tests. In a case where the measurement result of the throughput is simply compared with the throughput threshold value and the output level of the test signal is non-linearly controlled using the comparison result until the above-described test end condition is satisfied, it is clarified that there is a limit to the effect of reducing the time required to reach a desired output level.

(Parameter Newly Adopted in Reception Sensitivity Test)

Therefore, in the present embodiment, as the parameters to be adopted in the reception sensitivity test, a state where the value of the measured throughput drops to a certain proportion with respect to a value (100%) determined as a reference is further added in addition to the measurement result of the throughput and the comparison result with the throughput threshold value, and, thereafter, the output level variable setting is executed to reduce the number of measurements of the reception sensitivity test.

Figure 15:
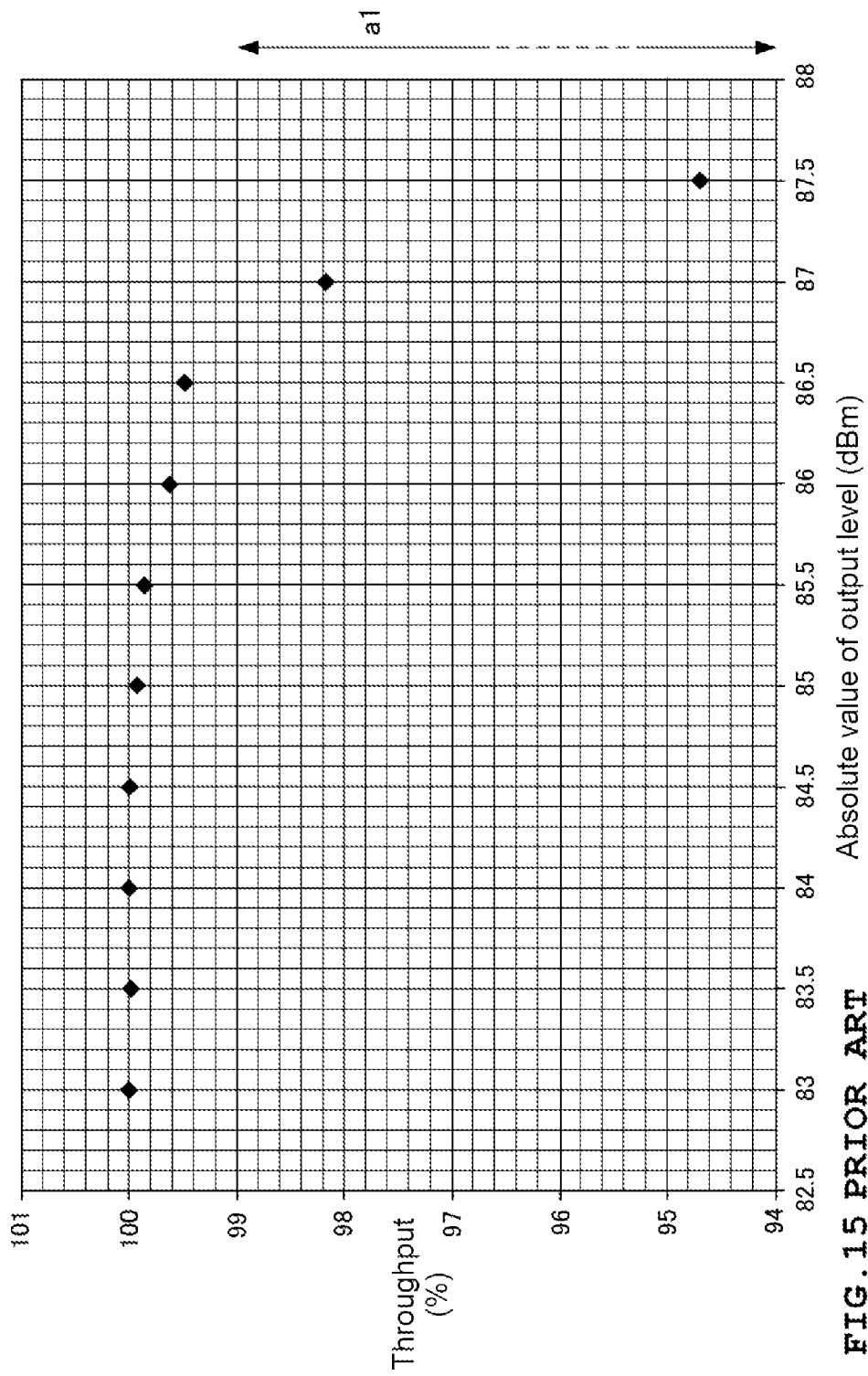
FIG. 15 is a graph showing the relationship of the output level of the test signal with respect to the throughput measurement value according to the reception sensitivity test of the DUT of the device according to the related art.

FIG. 15 shows a graph of variation characteristic of the output level of the test signal with respect to the throughput measurement value according to the reception sensitivity test of the DUT of a device according to the related art. The variation characteristic shown in the graph in FIG. 15 is a basis for adopting a drop state determination condition of the throughput measurement value in step S11 introduced as a check point (CP) in output level variable setting control shown in FIG. 8. In FIG. 15, reference numeral a1 indicates the steep drop area in which the throughput drops steeply. The graph shown in FIG. 15 is derived from the reception sensitivity test result (refer to FIG. 17) of the DUT 100 in the device according to the related art, and represents that the throughput measurement value steeply drops in the steep drop area a1. The example represents that, for example, in a case where a first throughput measurement value is set to 100% and the throughput measurement value is equal to or less than 99%, a throughput measurement value thereafter drops steeply.

In view of the throughput variation characteristics, in the present embodiment, the throughput measurement value during the reception sensitivity test of the DUT 100 is monitored, and a check point (CP) is provided to check whether or not the throughput measurement value is in a situation in which the throughput measurement value drops steeply using the determination condition set in advance. Further, in a case where the determination condition is satisfied at the CP (corresponding to step S11 in FIG. 8), that is, in a case where the throughput measurement value is a value in the steep drop area a1, a unique setting pattern, which is different from the setting pattern (refer to step S12a of FIG. 8) under the situation in which the throughput measurement value drops steeply, is applied in a case where the next output level of the test signal is set (also, refer to step S12b).

Figure 8:
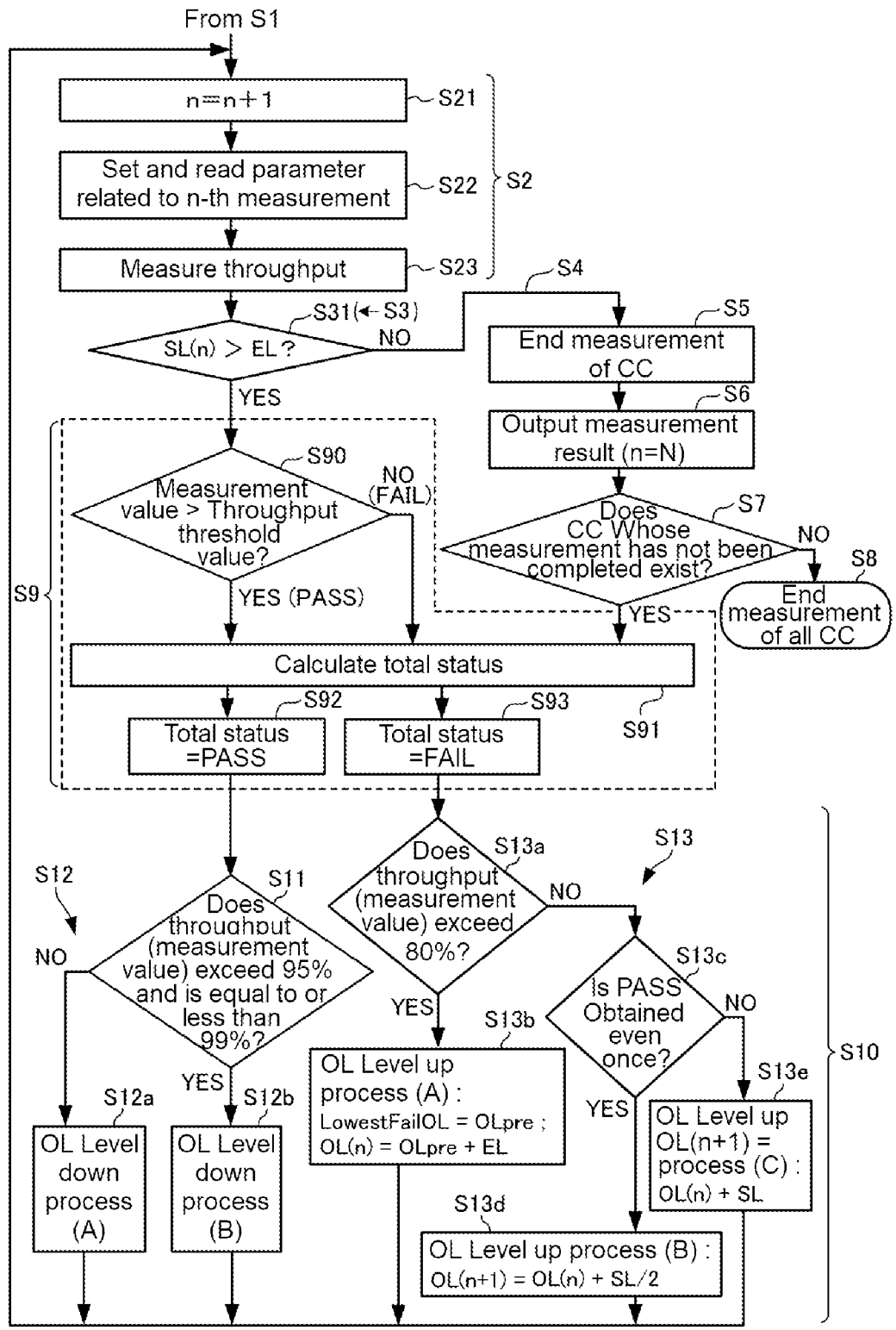
FIG. 8 is a flowchart showing a detailed processing operation of each processing step related to output level variable setting control in FIG. 7.

The unique setting pattern applied in the present embodiment is conditional upon a setting pattern in which, in a state where the throughput measurement value is dropped to a value in the steep drop area a1 in the graph of FIG. 15, the number of transmissions and receptions of the test signal related to the reception sensitivity test is reduced to the utmost, and which speedily reaches to a reception sensitivity test end condition by the error tolerance level EL (refer to step S31 in FIG. 8).

In the present embodiment, as an example of the above-described unique setting pattern, a pattern (refer to step S12b in FIG. 8) is adopted in which, in a case where the determination condition is satisfied at the CP (YES in step S11 of FIG. 8), a value, which is obtained by performing level down on the output level of the test signal by a value (2EL) twice the error tolerance level EL from the previous output level OL(OLpre), is set as a next output level OL(OL(n)) of the test signal.

The output level setting based on the unique setting pattern is an example in a case where a comparison result indicating that the measurement result of the throughput exceeds the threshold value is obtained and the measurement result of the throughput (measurement value) is a value in the steep drop area a1. Regarding the output level setting based on the unique setting pattern, in the present embodiment, thereafter, in a case where the comparison result indicating that the measurement result of the throughput is less than the threshold value is obtained, a pattern is used together in which a value, which is obtained by performing level up on the output level of the test signal by the value of the error tolerance level EL from the previous output level OL(OLpre), is set as the next output level OL(OL(n)) of the test signal (refer to FIG. 9B).

Based on the above-described method for reducing the time of the reception sensitivity test of the DUT 100 and the parameters (variation characteristics of the throughput measurement value) newly added in the reception sensitivity test, a variable setting control operation of the output level of the test signal according to the reception sensitivity test of the DUT 100 by the integrated control device 10 of the measurement device 1 according to the present embodiment will be described below with reference to FIGS. 7 to 10, and FIG. 15.

Figure 7:
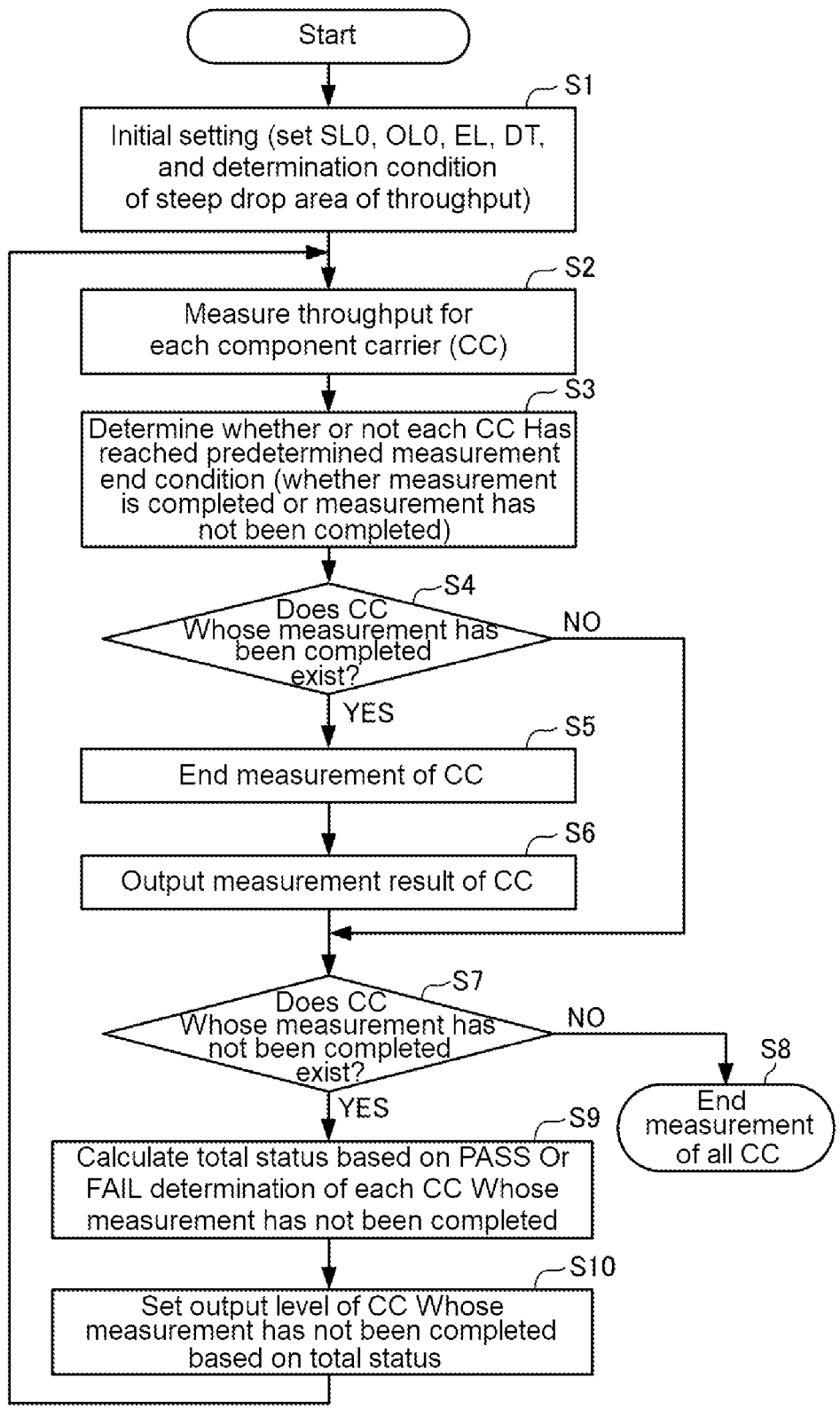
FIG. 7 is a flowchart showing an output level variable setting control operation, to which CP of a test signal including a plurality of CC is introduced, by the measurement device according to the embodiment of the present invention.

FIG. 7 is a flowchart showing a variable setting control operation of an output level, to which CP of a test signal including a plurality of CCs related to the reception sensitivity test of the DUT 100 is introduced, by the measurement device 1 according to the present embodiment of the present invention.

In a case where the reception sensitivity test of the DUT 100 starts along the flow chat shown in FIG. 7, first, the reception sensitivity test control unit 18 in the control unit 11 of the integrated control device 10 sets the test conditions (step S1). Specifically, the test condition setting unit 18a receives an operation input in the operation unit 12, and sets, for example, respective values of the initial step level SL0, the starting output level OL0, the error tolerance level EL, the connection drop determination threshold value DT, and the determination condition (refer to steps S11 and S13a of FIG. 8) of the steep drop area of the throughput.

Setting content of the test condition in step S1 is subject to output level setting control of the test signal including the plurality of CCs, and is assumes an operation of starting the first throughput measurement from a state where the DUT 100 is operated at the starting output level OL0 for each CC, measuring the throughput at the output level obtained by lowering the variation range by a width of an initial step level from the previous output level from the next measurement, and ending the measurement by determining a state where a step level SL(n) of the test signal is equal to or less than the error tolerance level EL in an n-th measurement while repeatedly performing a process of lowering the output level of the test signal (refer to the output level (OL) down processes (A) and (B)) in a case where the measured throughput is larger than the threshold value (throughput threshold value) and a process of raising the output level of the test signal (refer to the OL level up processes (A), (B), and (C)) in a case where the throughput is equal to or larger than the throughput threshold value.

Further, in the operation, it is assumed that the CP (refer to step S11 in FIG. 8) is provided to check whether or not the throughput measurement value is in a situation in which the throughput measurement value drops steeply using the determination condition set in advance, and, in a case where the throughput measurement value is in the situation in which the throughput measurement value drops steeply, the next output level setting of the test signal is performed by applying the above-described unique setting pattern (also refer to step S12b).

As the starting output level OL0 and the initial step level SL0, which are set in step S1, for example, −75 dBm and 10 dB are assumed, respectively. The error tolerance level EL is assumed to be, for example, 0.2 dB. The connection drop determination threshold value DT is assumed to be, for example, −90 dBm. Further, as the determination condition of the steep drop area of the throughput, for example, a condition is assumed that the throughput measurement value is set to a range of a proportion which exceeds 95% and is equal to or less than 99% with respect to the reference value.

After the setting of the test conditions in step S1 is completed, the reception sensitivity test control unit 18 starts the sensitivity test of the DUT 100 by a predetermined test start operation. In a case where the reception sensitivity test is started, the reception sensitivity test control unit 18 performs control to transmit and receive the test signal a plurality of times by setting the output level of the test signal for each time between the signal generation unit 21a of the NR system simulator 20 and the DUT 100 according to the set test conditions. At that time, the reception sensitivity test control unit 18 performs control so that the throughput is measured by the throughput measurement unit 18b for each of the plurality of CCs (CCs that have not reached the predetermined measurement end condition) of the test signal transmitted and received for each reception sensitivity test (step S2).

Next, the reception sensitivity test control unit 18 performs control to cause the end determination unit 18c1 of the test situation monitoring unit 18c to determine whether or not each CC reaches the predetermined measurement end condition, that is, whether or not the measurement has been completed. (step S3).

Further, the reception sensitivity test control unit 18 determines whether or not a CC whose measurement is completed exists based on the determination result in step S3 (step S4).

In a case where it is determined that the CC whose measurement has been completed exists (YES in step S4), the reception sensitivity test control unit 18 ends the throughput measurement of the CC (step S5), performs control to output the measurement result of the CC by the measurement result output unit 18e (step S6), and, thereafter, proceeds to step S7. On the other hand, in a case where it is determined that the CC whose measurement has been completed does not exist (NO in step S4), the reception sensitivity test control unit 18 proceeds to step S7 without passing through steps S5 and S6.

In step S7, the reception sensitivity test control unit 18 determines whether or not the CC whose measurement has not been completed exists based on the determination result in step S3. In a case where it is determined that the CC whose measurement has not been completed exists (YES in step S7), the reception sensitivity test control unit 18 controls the total status calculation unit 18c2 to perform determination (PASS or FAIL determination) of whether to be "PASS" or "FAIL" according to a comparison result (throughput value≥threshold value or throughput value<threshold value) obtained by comparing the measured throughput value with the predetermined throughput threshold value for each CC whose measurement has not been completed, and to calculate the total status which is the integrated determination result obtained by integrating a PASS or FAIL determination result for each CC (step S9).

In a case where the total status is calculated, the total status calculation unit 18c2 compares, for example, the number of PASS or FAIL of the throughput measurement result of each CC, determines PASS in a case where the number of FAIL≤the number of PASS, and determines "FAIL" in a case where the number of FAIL>the number of PASS.

Further, the reception sensitivity test control unit 18 controls the output level variable setting unit 18d so as to set the output level of the CC whose measurement has not been completed based on the total status calculated in step S9 (step S10).

In a case where the output level setting control of the CC whose measurement has not been completed in step S10 is completed, the reception sensitivity test control unit 18 returns to step S2 and performs control so that the processes after step S2 are continuously executed. During the period, in a case where it is determined that the CC whose measurement has not been completed does not exist in step S7 (NO in step S7), the reception sensitivity test control unit 18 controls to end the measurement of all CCs and ends a series of processes.

Next, a detailed processing operation of each of the processing steps (steps S2, S9, S10, and the like) related to the output level variable setting control in FIG. 7 will be described with reference to a flowchart shown in FIG. 8. In FIG. 8, the same processing steps as in FIG. 7 are designated by the same reference numerals. In particular, in FIG. 8 discloses that step S2 of FIG. 7 is composed of steps S21, S22, S23, step S3 of FIG. 7 is composed of step S31, step S9 of FIG. 7 is composed of steps S90, S91, S92, and S93, and step S10 in FIG. 7 is composed of steps S12 and S13.

In FIG. 8, for convenience, the series of processes after step S21 mainly shows one (arbitrary) CC among the plurality of CCs included in the test signal. In the output level variable setting control of the test signal including the plurality of CCs in the measurement device 1 according to the present embodiment, as can be seen from the description given with reference to FIG. 7, it is apparent that the same process is performed in parallel on each CC other than the above-described main CC according to the flowchart shown in FIG. 8. In FIG. 8, a flow of the processes (steps S21 to S23, and S31) of each CC merges in step S9. Here, the total status is calculated in step S91 through the PASS or FAIL determination of whether to be PASS or FAIL in step S90, and a next output level of each CC is set in step S10 based on the calculated total status. Here, a target of the output level setting is limited to the CC which is determined to not reach the predetermined measurement end condition and whose measurement has not been completed in step S31.

Figure 9A:
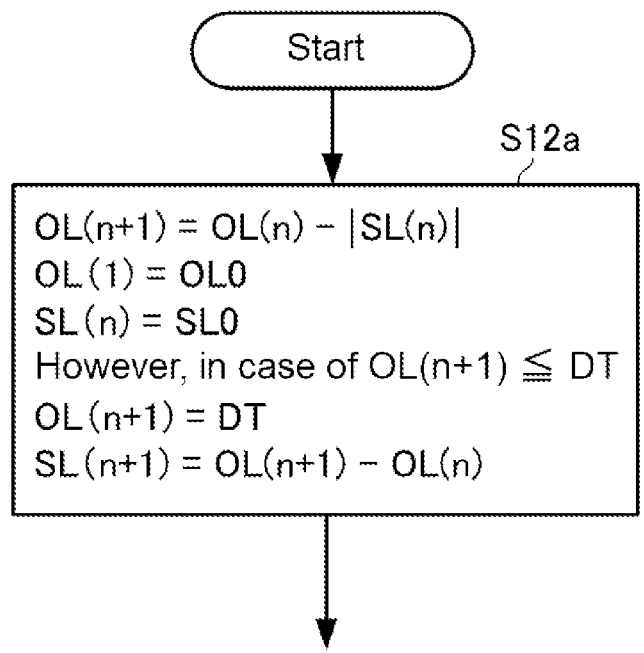
Figure 9B:
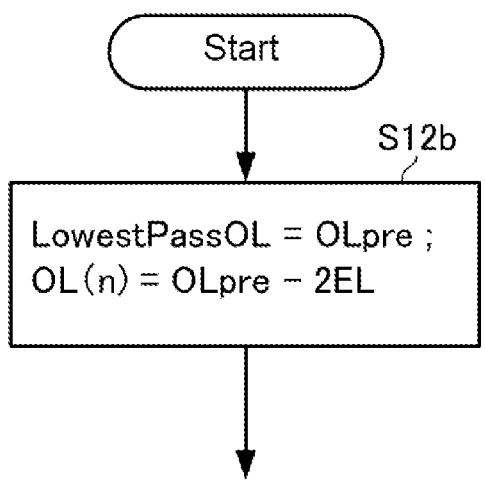

In FIG. 8, a process in step S11 is performed at a timing corresponding to the above-described CP. As the determination condition for determining whether or not the throughput measured in step S23 is in the steep dropped state (refer to the steep drop area a1 in FIG. 15), for example, a condition is applied that the throughput measurement value exceeds 95% and is equal to or less than 99% with respect to the reference value (for example, the value of the measured throughput value through the first transmission and reception. In a case of the first transmission and reception, measured throughput value is stored as 100%). Further, step S12*b* corresponds to a next output level setting process performed by applying the above-described unique setting pattern in a case where it is determined that the determination condition is satisfied in step S11 (YES in step S11), that is, the level down process (B). Details of the level down process (B) are shown in FIG. 9B.

Further, in FIG. 8, a process in step S13*a* is a processing step which is executed at a check point according to the above-described CP in the level up process of the test signal (refer to step S13 of FIG. 8), and which is used to determine whether or not the throughput measured in step S23 is in the steep dropped state by using a determination condition different from the above-described level down process. In step S13*a*, as the determination condition for determining whether or not the throughput is in the steep dropped state, for example, a condition is applied that the throughput measurement value exceeds 80% with respect to the reference value. In a case where the determination condition is satisfied (YES in step S13*a*), a level up process (A) is performed, and, in a case where the determination condition is not satisfied (NO in step S13*a*), a level up process (B) of the output level (OL) or a level up process (C) is performed.

As shown in FIG. 8, after the setting of the test condition in step S1 of FIG. 7 is completed, the reception sensitivity test control unit 18 of the integrated control device 10 increments the number of measurements n by +1 (step S21), and performs a process of setting a parameter related to the N-th measurement, and reading a value of the output level OL set in step S12 (including steps S12*a* and S12*b*) of performing, for example, the OL level down process or step S13 of performing the OL level up process before the setting (step S22). Subsequently, the reception sensitivity test control unit 18 performs control to perform the n-th measurement related to the throughput of the DUT 100 while transmitting the test signal based on the parameter, which is set (or read) in step S22, related to the measurement (step S23).

As a specific example of the control in steps S22 and S23 (throughput measurement control), the reception sensitivity test control unit 18 sets, as the parameter related to a first measurement, for example, the starting output level OL0 based on the setting of the test condition in step S1, and performs the throughput measurement while driving and controlling the DUT 100 at the starting output level OL0.

Next, the reception sensitivity test control unit 18 checks whether or not a step level interval with respect to the previous throughput measurement related to the current throughput measurement of the CC, that is, the step level SL(n) is larger than the error tolerance level EL which is set in step S1 (step S31). In a case where it is determined that the step level SL(n) is larger than the error tolerance level EL (YES in step S31), the reception sensitivity test control unit 18 proceeds to step S90 and continues the throughput measurement and step level search control. As described above, a first throughput measurement is started from the transmission of the test signal at the starting output level OL0, and there is no variation range of SL with respect to the previous measurement, so that the process of step S90 is skipped and the process proceeds to step S90.

In step S90, the reception sensitivity test control unit 18 compares the throughput (measurement value) of the DUT 100, which is measured in step S23, with a preset throughput threshold value for each CC which includes the CC and whose measurement has not been completed, and determines whether or not the throughput is equal to or larger than the throughput threshold value. Here, setting is performed so that the throughput threshold value is 95%, the throughput which is equal to or larger than 95% is in a permissible range "PASS", and the throughput which is lower than 95% is out of the permissible range "FAIL". In step S90, similarly, the throughput values of other CCs whose measurement have not been completed are compared with each throughput threshold value, and the "PASS" or "FAIL" determination is performed.

Subsequently, the reception sensitivity test control unit 18 performs control so that the total status calculation unit 18*c*2 calculates the integrated determination result (total status) (step S91) obtained by integrating the "PASS" or "FAIL" determination for each CC whose measurement has not been completed (Step S91). Here, the total status calculation unit 18*c*2 compares, for example, the number of PASS or FAIL of the throughput measurement result of each CC whose measurement has not been completed, determines "PASS", for example, in a case where the number of FAIL≤the number of PASS. (step S92), and determines FAIL in a case where the number of FAIL>the number of PASS (step S93).

Here, in a case where it is determined that the total status is "PASS" in step S91 (refer to step S92), the drop state determination unit 18c3 then determines whether or not the throughput measurement value satisfies the determination condition of the range of the proportion which exceeds 95% and is equal to or less than 99% with respect to the reference value (step S11). Here, in a case where it is determined that the throughput measurement value exceeds 99% with respect to the reference value and the determination condition is not satisfied (NO in step S11), the reception sensitivity test control unit 18 executes the OL level (output level) down process (A) of lowering the output level of the test signal (step S12a). As shown in FIG. 9A, in the OL level down process (A), a process of lowering the output level by a step of the initial step level SL0 from a previous OL (OL(n)) is executed on a next output level OL(n+1). As the first output level OL(1), setting is performed so that OL(1)= OL0.

Further, in a case where it is determined, by the drop state determination unit 18c3, that the throughput measurement value is in the range of the proportion which exceeds 95% and is equal to or less than 99% with respect to the reference value (steep drop area a1) and the above determination condition is satisfied (YES in step S11), the reception sensitivity test control unit 18 executes the OL level down process (B) (step S12b). As shown in FIG. 9B, in the OL level down process (B), a process is executed of defining the previous output level (OLpre) as the lowest output level (Lowest Pass OL) in a case of PASS determination, and setting the next OL level (OL(n)) to a value (OLpre−2EL) obtained by lowering the level (2EL) corresponding to twice the error tolerance level EL from the previous output level (OLpre). The OL level down process (A) and the OL level down process (B) described above correspond to a first level setting process and a second level setting process of the present invention, respectively.

After executing the process in step S12a or step S12b, the reception sensitivity test control unit 18 increments the number of measurements n by +1 (step S21), and sets and reads the parameter related to the n-th measurement (step S22). As a result, after the process in step S12a, the OL level that is leveled down by the initial step level SL0=10 dB from the previous OL level is set. After the process in step S12b, the OL level that is leveled down by a value corresponding to 2EL from the previous OL level is set, and the throughput measurement is performed based on the test signal each having the set OL level (step S23).

On the other hand, in a case where it is determined that the total status is "FAIL" (refer to step S93) in step S91, the reception sensitivity test control unit 18 performs the determination process in step S13a, and further executes any of the OL level up processes (A), (B), and (C) of raising the output level of the test signal based on the determination result (step S13). The OL level up process (B) and the OL level up process (C) correspond to a third level setting process and a fourth level setting process of the present invention, respectively.

Further, after the total status is determined to be "FAIL" in step S91, the reception sensitivity test control unit 18 first determines whether or not the determination condition that the throughput measurement value exceeds 80% with respect to the reference value is satisfied (step S13a).

Here, in a case where it is determined that the throughput measurement value exceeds 80% with respect to the reference value and the determination condition is satisfied (YES in step S13a), the reception sensitivity test control unit 18 executes the OL level up process (A) of lowering the output level of the test signal (step S13b).

In the OL level up process (A), a process is executed of defining the previous output level (OLpre) as the lowest output level (Lowest Fail OL) in a case of FAIL determination, and setting the next OL level (OL(n)) to a value (OLpre+EL) obtained by raising the level (EL) corresponding to the error tolerance level EL from the previous output level (OLpre).

On the other hand, in a case where it is determined that the throughput measurement value is equal to or less than 80% with respect to the reference value and the determination condition is not satisfied (NO in step S13a), the reception sensitivity test control unit 18 checks whether or not PASS is obtained even once so far (step S13c). In a case where it is determined that PASS is obtained even once (YES in step S13c), an OL level up process (B) is executed (step S13b). In the OL level up process (B), a process of raising the output level by a half step of the step level SL from the previous OL(n) is executed on the next output level OL(n+ 1).

Further, in a case where it is determined that the PASS is not obtained ever once (NO in step S13c), an OL level up process (C) is executed (step S13c). In the OL level up process (C), a process of raising the output level by a step of the step level SL0 from the previous output level OL(n) is executed on the next output level OL(n+1)

After executing the process in step S13, that is, any of the OL level up processes (A), (B), and (C), the reception sensitivity test control unit 18 increments the number of measurements n by +1 (step S21), and sets and reads the parameter related to the n-th measurement (step S22). As a result, after the process in step S13, the OL level that is leveled up by a value corresponding to the error tolerance level EL from the previous OL level is set, and the throughput measurement is performed based on the test signal having the set OL level (step S23).

After executing the throughput measurement in step S23, the reception sensitivity test control unit 18 checks, for each CC, whether or not the step level interval with respect to the previous throughput measurement related to the current throughput measurement, that is, the step level SL(n) is larger than the error tolerance level EL which is set in step S1 (step S31). Here, in a case where it is determined that the step level SL(n) is equal to or less than the error tolerance level EL (NO in step S31), the reception sensitivity test control unit 18 stops the throughput measurement of the CC and a step level search (step S5), and, thereafter, controls to not perform the throughput measurement of the CC.

Next, the reception sensitivity test control unit 18 sets the number of throughput measurements, which is obtained in a case where the measurement operation ends, to N times, controls the measurement result output unit 18e to output the measurement result up to that time, such as information indicating transition of the throughput measurement result from the first time to the N-th time (step S6), and displays the measurement screen 130a (refer to FIG. 16) including the measurement result on the display unit 13.

Subsequently, the reception sensitivity test control unit 18 determines whether or not a CC whose measurement has not been completed exists (step S7). In a case where it is determined that the CC whose measurement has not been completed exists (YES in step S7), the process proceeds to a total status calculation process in step S91. After that, the reception sensitivity test control unit 18 performs control to repeat the processes after step 21 on the CC whose measurement has not been completed through the process in step S10 based on the total status calculated in step S91 (refer to steps S92 and S93).

The control is repeatedly performed while it is determined that the CC whose measurement has not been completed exists in step S7 (YES in step S7). During the period, in a case where it is determined that the CC whose measurement has not been completed does not exist (NO in step S7), the reception sensitivity test control unit 18 performs control to end the throughput measurement of all CCs of the test signal (step S8), and controls to end the series of output level setting control described above.

Next, a relationship between the output level, which is set for each CC according to the number of measurements in the output level variable setting control (refer to FIGS. 7 and 8) by the measurement device 1 according to the present embodiment, and the relevant parameters will be described with reference to a table diagram shown in FIG. 10.

The table diagram shown in FIG. 10 corresponds to the output level setting control of the test signal including four CCs having different frequency bands, for example, PCC, SCC1, SCC2, and SCC3. Each CC described here is only an example, and other CCs may be used. Further, the number of CCs included in the test signal is not limited to four, and may be another number.

The table diagram shown in FIG. 10 is described with step numbers in a vertical direction in the leftmost frame and various parameters (output level (Lvl), throughput (Tput %), PASS or FAIL determination result (J), step value (step) from previous step, and output level (OL)) which are arranged in a horizontal direction in the uppermost frame and correspond to each of the CCs of PCC, SCC1, SCC2, and SCC3, respectively. Further, in the table diagram, data groups of particular interest is designated by reference numerals D11, D12, D13, D14, D21, D22, and D31, and frames thereof are shaded according to the type thereof.

According to the table diagram, in the output level setting control performed in parallel for the four CCs including PCC, SCC1, SCC2, and SCC3, the throughput measurement of both PCC and SCC1 ends in a fifth reception sensitivity test (refer to data groups D11 and D12), and the throughput measurement of SCC2 ends in a sixth reception sensitivity test (refer to data group D13). For the CCs, that is, SCC1 and SCC2 have a step value (step)+0.2 dBm from the previous step at immediately before the end (fourth and fifth), both satisfies the measurement end conditions (set value of EL=0.2≥step), and stops (ends) the measurement the PASS or FAIL determination is "PASS".

For SCC3, the step value (step) from the previous step is equal to or less than the set value of EL=0.2 and does not become "PASS" until the end (eighth) (refer to data group D31). Therefore, it is considered that the second throughput measurement ends, which is determined to be "PASS" at the end before the eighth measurement and the second measurement result is output (refer to data group D14), and the ninth reception sensitivity test is not performed.

Further, in the table diagram shown in FIG. 10, a column of "Comment" is provided, and a comment related to the output level setting is added to correspond to the number of measurements (steps). According to this, for the third step (third time) and the fourth step, it is shown that the step level is lowered by the usual dichotomy because the Tput of SCC3 is low.

For the fifth step, although the original set value of SCC2 is set as OL6=LowestPass−EL, a level of SCC3 is low, so that it is shown that the set value is set to −78.5 dB.

For the sixth step, since the step of SCC3 is less than EL, it is shown that the measurement is performed by returning to the value of EL. Furthermore, for the seventh step, a difference between OL7 and OL2 of SCC3 is within a range of double EL (−78−(−78.3))=0.3 EL is 0.2), so the CP condition is satisfied. As a result, it is shown that setting is performed such that OL8=LowestPass−EL.

As shown in FIGS. 7 to 10, in the measurement device 1 according to the present embodiment, control is performed so that the reception sensitivity test control unit 18 provided in the control unit 11 of the integrated control device 10 executes, for each of a plurality of CCs, the reception sensitivity test using the test signal including the plurality of CCs, ends the throughput measurement of the CC in a case where any of each CC reaches the measurement end condition, and continues the reception sensitivity test for the CC that has not reached the measurement end condition until all of the plurality of CCs reach the measurement end condition.

By the control, the measurement device 1 can significantly reduce measurement time, as compared with a device which has not a function of ending the throughput measurement of the CC that has reached the throughput measurement end condition first in the reception sensitivity test for the plurality of CCs and continuing the throughput measurement for only a remaining CC until reaching the throughput measurement end condition.

Further, in the measurement device 1 according to the present embodiment, the CP condition is applied as a control parameter in a case where the next output level is set in the output level setting control in the reception sensitivity test performed for each CC. In addition to the control to end the throughput measurement of the CC that has reached the above-described throughput measurement end condition first, an effect of shortening the measurement time in a case where the CP condition is applied can also be expected.

For example, according to a series of measurement controls shown in FIG. 8, for each CC whose measurement has not been completed, it is determined whether or not the determination condition in which the throughput measurement value at a processing timing corresponding to CP (refer to step S11) is in the range of the proportion which exceeds 95% and is equal to or less than 99% with respect to the reference value is satisfied. In a case where the throughput measurement value satisfies the determination condition, the process proceeds to step S12b, thereby performs the level down process (B) of performing level down on the output level of the test signal by the value corresponding to 2EL from the previous OL level using the unique setting pattern that does not depend on the setting pattern in step S12a in a case where the determination condition is not satisfied. The level down process (B) operates to reduce the number of transmissions and receptions of the test signal related to the reception sensitivity test, and to reach a state which satisfies the reception sensitivity test end condition (refer to step S31) by the error tolerance level EL with a smaller number of throughput measurements.

Hereinafter, the action (measurement time shortening action) will be verified with reference to FIGS. 11 to 14. Here, for simplicity, an operation in a case where the test signal including a single (one) carrier is used will be described.

FIG. 11 shows a data example of the parameter related to the output level of the test signal, which is set according to the number of measurements by the output level variable setting control (refer to FIG. 8) by the measurement device 1 according to the present embodiment. The example of FIG. 11 shows, for example, with respect to each of the total four number of measurements for the test signal, a relationship of the output level of the test signal of the measurement, the measured throughput, the determination result based on the determination condition of the steep drop area of the throughput measurement value, the variation range of the output level between the previous measurement and the current measurement, a next output level setting process type, and the next output level of the test signal.

FIG. 13 shows the characteristic C1 related to the number of measurements of the test signal and the output level of the test signal related to the reception sensitivity test of the DUT 100 by the measurement device 1 according to the present embodiment, and the characteristic C2 related to the throughput (measurement value) with respect to the number of measurements. The characteristics C1 and C2 are based on the data examples shown in FIG. 12 (refer to the first and third to fifth columns from the left), respectively. That is, in FIG. 13, the characteristic C1 gives an example in which the total four number of throughput measurements (output level variable setting), which are indicated by the reference numerals P11 to P14 for the test signal, are performed and the reception sensitivity test is ended.

As shown in the characteristic C1 in FIG. 13 and FIGS. 11 and 12 (refer to the first to third columns from the left), in the measurement device 1 according to the present embodiment, in a first measurement, the test is started with the DUT 100 while setting the output level OL(1)=−75 dBm at the measurement point P11 of the characteristic C1. Since the throughput measured at this time is a value higher than the throughput threshold value and is determined to be in the permissible range "PASS", the process proceeds to the determination process based on the determination condition of the steep drop area of the throughput measurement value. Here, a determination result ("NO"), which indicates that the throughput measurement value is outside the region of the steep drop area a1 and the determination condition is not satisfied, is obtained, and the process proceeds to the OL level down process (A) (refer to step S12a in FIG. 8).

In the OL level down process (A), the initial step level SL0 (=−10 dB), which functions as the step level SL(1), is set to be leveled down from the output level OL(1)=−75 dBm, and (OL(1)−SL(1))=−85 dBm is set as a second output level OL(2).

Subsequently, in a second measurement, the test of the DUT 100 is continued with the output level OL(2)=−85 dBm at the measurement point P12 of the characteristic C1. Since the throughput measured at this time became a value higher than the throughput threshold value and is determined to be in the permissible range "PASS", the process proceeds to the determination process based on the determination condition of the steep drop area of the throughput measurement value. Here, a determination result ("YES"), which indicates that the throughput measurement value is a value in the region of the steep drop area a1 and the determination condition is satisfied, is obtained, and the process proceeds to the OL level down process (B) (refer to step S12b of FIG. 8 and FIG. 9B).

In the OL level down process (B), the output level OL(2)=−85 dBm is set to level down 2EL=0.4 dB, which is twice the value of the error tolerance level EL, and (OL(2)−2EL)=−85.4 dBm is set as a third output level OL(3).

Subsequently, in a third measurement, the test of the DUT 100 is continued with the output level OL(3)=−85.4 dBm at the measurement point P13 of the characteristic C1. Since the throughput measured at this time is a value less than the throughput threshold value and is determined to be out of the permissible range "FAIL", the process proceeds to the OL level up process (A) (refer to step S13b in FIG. 8).

In the OL level up process (A), 0.2 dB, which is the value of the error tolerance level EL, is set to level up from the output level OL(3)=−85.4 dBm, and (OL(3)+EL)=−85.2 dBm is set as a fourth output level OL(4).

Subsequently, in a fourth measurement, the test of the DUT 100 is continued with the output level OL(4)=−85.2 dBm at the measurement point P14 of the characteristic C1. Here, a difference (absolute value) between the current output level OL(4) and the output level OL(3) set at the third measurement is (85.2−85.4)=0.2 dB. Therefore, the value of the difference is equal to or less than the error tolerance level EL, and the end condition (SL(n)≥EL; NO in step S31 of FIG. 8) of the output level variable setting control (reception sensitivity test) is satisfied, so that the reception sensitivity test is ended.

As shown in the characteristic C1 and FIGS. 11 and 12 (refer to the first and third to fifth columns from the left), in the measurement device 1 according to the present embodiment, it is checked whether or not the throughput measurement value at the CP having the test signal is in the steep drop area a1. In a case where the throughput measurement value is in the steep drop area a1, the level down process (refer to step S12b in FIG. 8) and the level up process (refer to step S13 in FIG. 8) which are performed in a case where the next output level is set, are performed in units of the error tolerance level EL, so that it is possible to realize the reception sensitivity test with four measurements.

On the other hand, in the existing test signal output level control, to which a technology for performing the level down or level up in units of the error tolerance level EL is not introduced in a case where the above-described CP and the throughput measurement value are in the steep drop area a1, for example, a total of nine measurements are necessary using the measurement points P31 to P39 until the end of the reception sensitivity test, as shown using the characteristic C3 in FIG. 13 (in addition, refer to the first and second columns from the left in FIG. 12). According to the test signal output level control, to which the CP according to the present embodiment, the level down process in step S12b of FIG. 8, and the level up process in step S13b of FIG. 8 are introduced, the effect of reducing the number of measurements by 2.25 (=9/4) times for one CC can be expected with respect to the existing test signal output level control.

Figure 14:
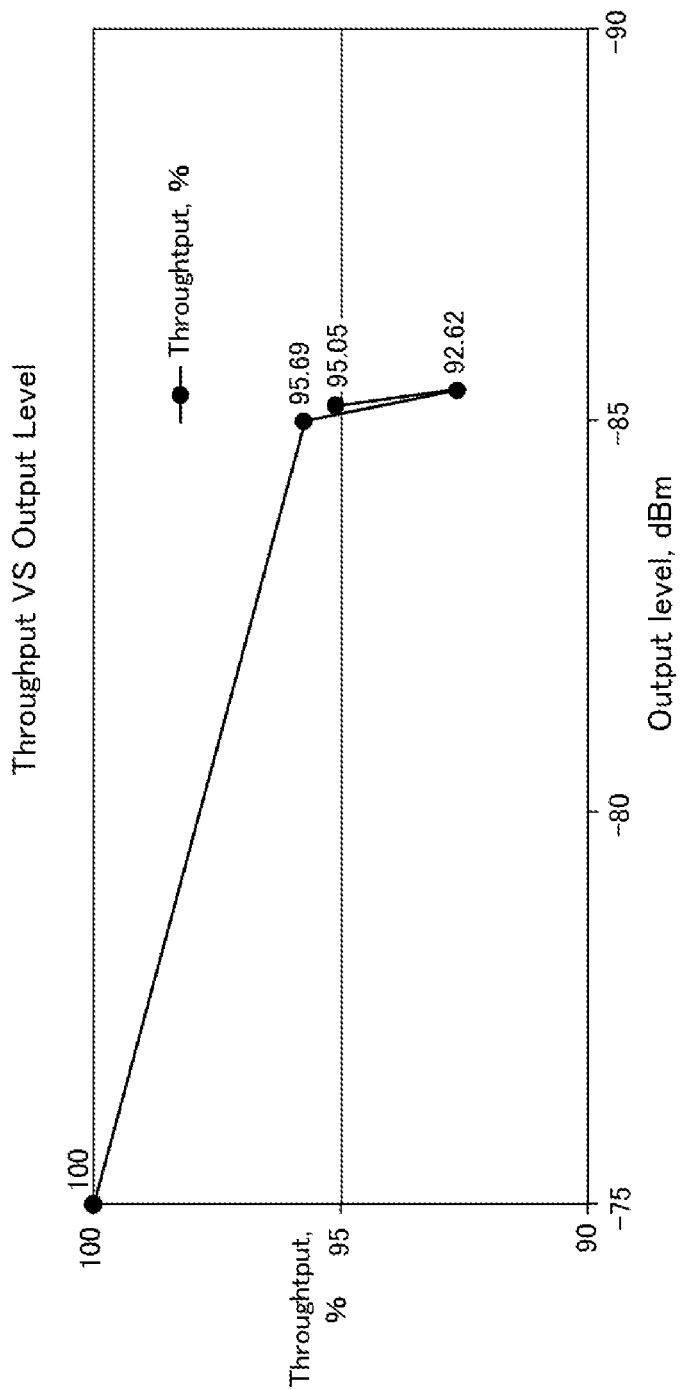
FIG. 14 is a graph showing an example of a characteristic related to the output level of the test signal and the measured throughput related to the reception sensitivity test of the DUT of the measurement device according to the embodiment of the present invention.

FIG. 14 shows an example of the characteristics related to the measured throughput with respect to the output level of the test signal in the variable setting control of the output level according to the present embodiment, to which the CP and the technology for performing level down or level up in units of the error tolerance level EL in a case where the throughput measurement value is in the steep drop area a1 are introduced (refer to FIG. 8). According to a graph shown in FIG. 14, since the CP and the technology for performing level down or level up in units of the error tolerance level EL in a case where the throughput measurement value is in the steep drop area a1 are introduced, it is possible to understand that a high throughput point can be omitted because the throughput measurement value at a second measurement point drops steeply.

Figure 16:
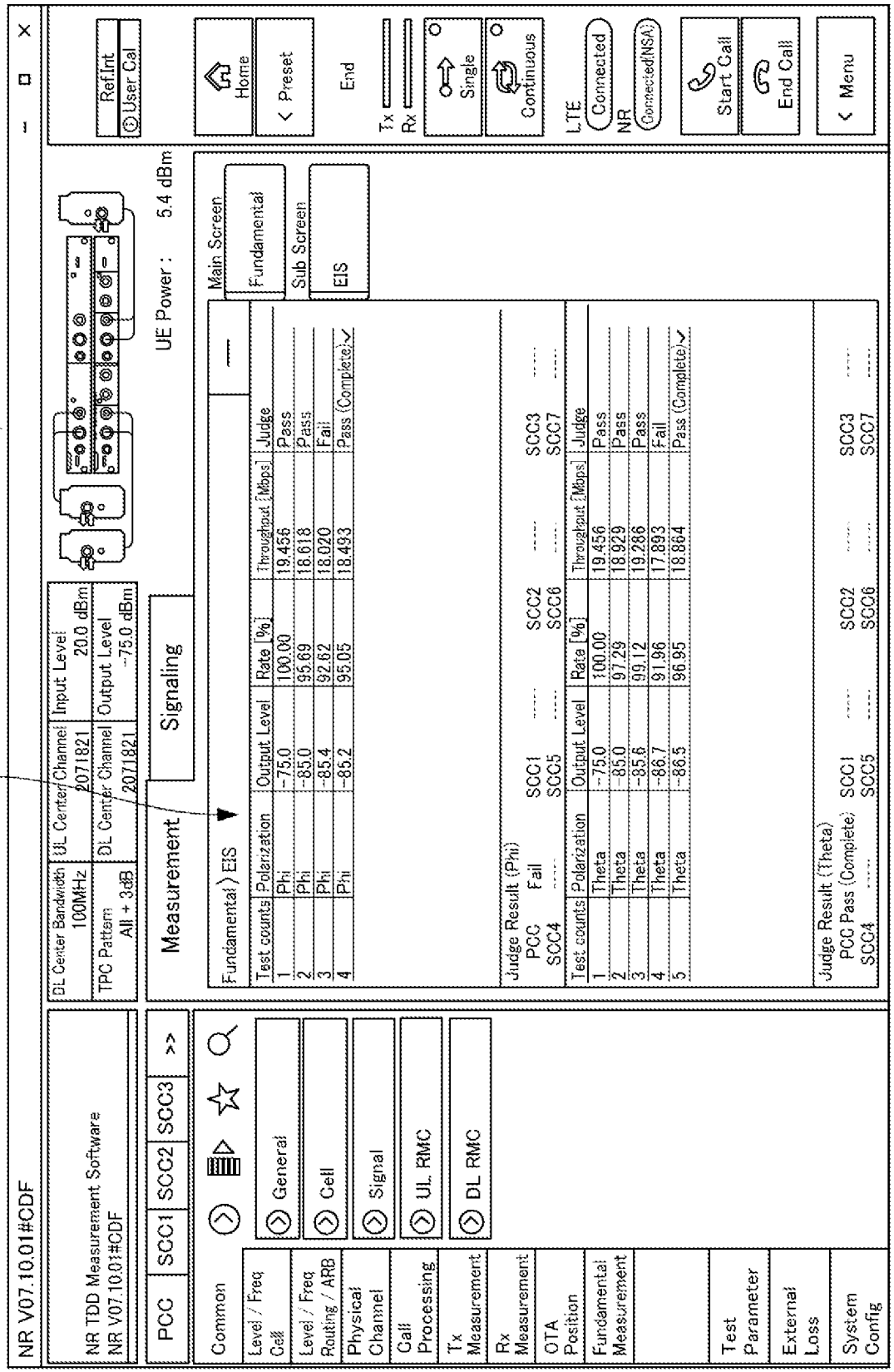
FIG. 16 is a diagram showing a display example of a reception sensitivity test result of the DUT based on the output level variable setting control, to which the CP of the test signal including a plurality of CCs is introduced, by the measurement device according to the embodiment of the present invention.

FIG. 16 is a diagram showing a display example of the reception sensitivity test result of the DUT 100 by the measurement device 1 according to the present embodiment. Here, a display example is shown in a case where the test signal is composed of one carrier. During the reception sensitivity test operation control of the DUT 100 according to the flowchart shown in FIG. 8, the display unit 13 of the integrated control device 10 displays, for example, the measurement screen 130a having a screen configuration shown in FIG. 16. The measurement screen 130a includes a test result display area 130b that displays the throughput measurement result (reception sensitivity) of the DUT 100 according to the number of measurements. According to the measurement device 1 according to the present embodiment, in the test result display area 130b on the measurement screen 130a, the measurement results of the four times of throughput measurements accompanied by the variation of the step level SL of the characteristic C1 shown in FIG. 13 are displayed in a mode of being arranged in chronological order according to the passage of time in a downward direction from an upper part in FIG. 13.

FIG. 17 shows a display example of the reception sensitivity test results of the DUT 100 in a device according to the related art in order to compare with the display example of the reception sensitivity test results of the DUT 100 by the measurement device 1 according to the present embodiment. As shown in FIG. 17, a measurement screen 135a of a device according to the related art has a test result display area 135b. In the test result display area 135b, for example, the measurement results of 10 times of throughput measurements accompanied by a linear variation of the step level SL are displayed in a mode of being arranged in chronological order according to the passage of time in the downward direction from an upper part in FIG. 17.

In description of the effect of shortening the test time of the reception sensitivity test to which CP is introduced based on FIGS. 11 to 14, an example is given in which the test signal including a single carrier is used. However, even in the reception sensitivity test using the test signal including the plurality of CCs, it is apparent that the same effect can be expected for all CCs.

That is, according to the measurement device 1 according to the present embodiment, which is premised on performing the reception sensitivity test using the test signal including the plurality of CCs as shown in FIGS. 7 and 8, the setting control is applied to perform level down or level up in units of the error tolerance level EL in a case where CP and the throughput measurement value are in the steep drop area a1 for each CC, so that it is possible to significantly reduce the time required until the throughput measurement of all CCs ends, as compared with the measurement device that has not the setting control function.

Further, the above embodiment discloses a system configuration example in which the integrated control device 10 is provided outside the measurement device 1. However, the present invention may have a configuration in which the measurement device 1 is provided with a control function of the integrated control device 10.

As described above, the measurement device 1 according to the present embodiment includes an NR system simulator 20 having a signal generation unit 21a that generates a test signal including a plurality of CCs, and a reception sensitivity test control unit 18 that executes a reception sensitivity test of measuring (calculating) reception sensitivity of a DUT 100 by repeating transmission and reception of the test signal from the signal generation unit 21a to the DUT 100, and performs a test of the DUT 100.

In the measurement device 1, the signal generation unit 21a generates the test signal including a plurality of CCs, and the reception sensitivity test control unit 18 includes a throughput measurement unit 18b that measures a throughput of a CC that have not reached a predetermined measurement end condition among the plurality of CCs to be transmitted and received for each time, an end determination unit 18c1 that, for each CC whose throughput is measured, determines whether or not the measured throughput value has reached the predetermined measurement end condition, a total status calculation unit 18c2 that, for each CC that has not reached the measurement end condition, performs "PASS" or "FAIL" determination based on a comparison result of the measured throughput value and a predetermined threshold value, and calculates a total status obtained by integrating a determination result, and an output level variable setting unit 18d that sets a next output level for the CC that has not reached the measurement end condition based on the total status, in which the reception sensitivity test is executed for each of the plurality of CCs, the throughput measurement of the CC ends in a case where any of each CC reaches the measurement end condition, and the reception sensitivity test is continued for the CC that has not reached the measurement end condition until all of the plurality of CCs reach the measurement end condition.

With the configuration, the measurement device 1 according to the present embodiment can correspond to a test signal including the plurality of CCs, and, thereafter, in a case where any of the plurality of CCs reaches the measurement end condition, performs control so that the throughput measurement of the CC is not performed, so that measurement time can be significantly shortened as compared with a case where the measurement of all the CCs is continued until the measurement of all the CCs is completed.

Further, in the measurement device 1 according to the present embodiment, the total status calculation unit 18c2 compares the number of determination results for each CC, and calculates the total status as "PASS" in a case of the number of FAIL≤the number of PASS and as "FAIL" in a case of the number of FAIL>the number of PASS.

With the configuration, the measurement device 1 according to the present embodiment can easily calculate the total status regardless of the number of CCs whose measurement has not been completed, so that it becomes easy to correspond to the reception sensitivity test using the test signal including the plurality of CCs.

Further, in the measurement device 1 according to the present embodiment, the output level variable setting unit 18d, in a case where the total status is "PASS", sets a level of a next output signal by a first level setting process (S12a) of lowering the output level in a step of an initial step level (SL0) from a previous output level (OL(n)) or a second level setting process (S12b) of lowering a level (2×EL) corresponding to twice an error tolerance level (EL) from the previous output level, and, in a case where the total status is "FAIL", sets the level of the next output signal by a third level setting process (S13d) of raising a level (SL/2) corresponding to ½ of a previous step level (SL) from the previous output level or a fourth level setting process (13e) of raising a level (SL) corresponding to the previous step level from the previous output level.

With the configuration, the measurement device 1 according to the present embodiment makes full use of the first level setting process, the second level setting process, the third level setting process, and the fourth level setting process, so that non-linear output level change setting is possible in consideration of the throughput of each CC of the test signal including the plurality of CCs, and the measurement time can be shortened compared to a case where linear change setting is performed.

Further, in the measurement device 1 according to the present embodiment, the reception sensitivity test control unit 18 further includes a drop state determination unit 18c3 that determines whether or not a dropped state to a preset proportion in a steep drop area related to a characteristic that a measurement result of the throughput is steeply drops, for each CC which has not reached the measurement end condition, and the output level variable setting unit 18d performs, for each CC which has not reached the measurement end condition, a setting process (S12, S13) which includes a setting process of setting the output level for the CC to be different from the previous output level according to the determination result of whether or not to be the dropped state by the drop state determination unit 18c3, that is, a process (S12b, S13b) of performing level down or level up on the output level for the CC with respect to the previous level in units of a predetermined variation range (EL) in a case where it is determined to be the dropped state.

With the configuration, in the measurement device 1 according to the present embodiment, on the carrier whose measurement has not been completed, check of previous and current variation range is executed while performing level down or level up in units of the predetermined variation range (EL) of the output level in a state in which the measured throughput drops to the proportion in the steep drop area. As a result, compared to a case of continuing level down or level up on the output level with a step variation range simply derived from an initial step variation range, it is possible to reduce the number of transmissions and receptions, so that it is possible to reduce the measurement time.

Further, a mobile terminal testing method according to the present embodiment is a mobile terminal testing method using a measurement device 1, which performs a test of a DUT 100 and which includes a signal generation unit 21a that generates a test signal including a plurality of CCS, and a reception sensitivity test control unit 18 that performs a reception sensitivity test of the DUT 100 by setting an output level of the test signal for each time and transmitting and receiving the test signal a plurality of times between the signal generation unit 21a and the DUT 100, the mobile terminal testing method including: a measurement step (S2) of measuring a throughput of a CC that has not reached a predetermined measurement end condition among the plurality of CCs transmitted and received for each time; a determination step (S3) of determining whether or not the measured throughput value has reached the predetermined measurement end condition for each CC whose throughput has been measured; total status calculation step (S9) of, for each CC that has not reached the measurement end condition, performing "PASS" or "FAIL" determination based on a comparison result of the measured throughput value and a predetermined threshold value, and calculating a total status obtained by integrating a result of each determination; and output level setting step (S10) of setting a next output level for the CC that has not reached the measurement end condition based on the total status, in which the reception sensitivity test is executed for each of the plurality of CCs, the throughput measurement of the CC ends in a case where any of each CC reaches the measurement end condition, and the reception sensitivity test is continued for the CC that has not reached the measurement end condition until all of the plurality of CCs reach the measurement end condition.

With the configuration, the mobile terminal testing method according to the present embodiment can correspond to a test signal including the plurality of CCs, and, thereafter, in a case where any of the plurality of CCs reaches the measurement end condition, performs control so that the throughput measurement of the CC is not performed, so that measurement time can be significantly shortened as compared with a case where the measurement of all the CCs is continued until the measurement of all the CCs is completed.

INDUSTRIAL APPLICABILITY

As described above, the mobile terminal testing device and the mobile terminal testing method according to the present invention have an effect capable of shortening the time required to end the reception sensitivity test of all the CCs bundled by the CA of the mobile terminal which adopts the CA, and is useful for a mobile terminal testing device and a measurement method for performing the reception sensitivity test of a mobile terminal such as 5G wireless terminal that adopts the CA.

DESCRIPTION OF REFERENCE NUMERALS AND SIGNS

1: Measurement device (Mobile terminal testing device)
5: Test antenna
18: Reception sensitivity test control unit (Reception sensitivity test execution means)
18b: Throughput measurement unit (Throughput measurement means)
18c: Test situation monitoring unit
18c1: End determination unit (determination means)
18c2: Total status calculation unit (integrated determination result calculation means)
18e: Output level variable setting unit (Output level setting means)
18c3: Drop state determination unit (Drop state determination means)
20: NR system simulator
21a: Signal generation unit (signal generator)
100: DUT (Device Under Test, Mobile terminal)

What is claimed is:

1. A mobile terminal testing device, which performs a test of a mobile terminal that is a device under test, comprising:
a signal generator that generates a test signal; and
reception sensitivity test execution means for performing a reception sensitivity test of the device under test by setting an output level of the test signal for each time and transmitting and receiving the test signal between the signal generator and the device under test, wherein
the signal generator generates the test signal including a plurality of carriers,
the reception sensitivity test execution means includes
throughput measurement means for measuring a throughput of the plurality of carriers transmitted and received for each time,
determination means for determining whether or not a value of the measured throughput has reached a predetermined measurement end condition for each carrier, and
integrated determination result calculation means for, for each carrier that has not reached the measurement end condition, performing "PASS" or "FAIL" determination based on a comparison result of the value of the measured throughput and a predetermined threshold value, and calculating an integrated determination result obtained by integrating a result of each determination, and
output level setting means for setting a next output level for the carrier that has not reached the measurement end condition based on the integrated determination result, and
the reception sensitivity test is executed for each of the plurality of carriers, in a case where any of carriers reaches the measurement end condition, the throughput measurement of the carrier ends, and the reception sensitivity test is continued for the carrier that has not reached the measurement end condition until all of the plurality of carriers reach the measurement end condition.

2. The mobile terminal testing device according to claim 1, wherein
the integrated determination result calculation means compares the number of determination results for each carrier, and calculates the integrated determination result as "PASS" in a case of the number of FAIL≤the number of PASS and as "FAIL" in a case of the number of FAIL>the number of PASS.

3. The mobile terminal testing device according to claim 2, wherein
the output level setting means
sets a level of a next output signal by a first level setting process of lowering the output level by a step of an initial step level from a previous output level or a second level setting process of lowering a level corresponding to twice an error tolerance level from the previous output level in a case where the integrated determination result is "PASS", and
sets the level of the next output signal by a third level setting process of raising a level corresponding to ½ of a previous step level from the previous output level or a fourth level setting process of raising a level corresponding to the previous step level from the previous output level in a case where the integrated determination result is "FAIL".

4. The mobile terminal testing device according to claim 2, wherein
the reception sensitivity test execution means further includes drop state determination means for determining whether or not to be a dropped state to a preset proportion in a steep drop area related to a characteristic that a measurement result of the throughput is drops steeply, for each carrier which has not reached the measurement end condition, and
the output level setting means performs, for each carrier which has not reached the measurement end condition, a setting process of setting the output level for the carrier to be different from the previous output level according to the integrated determination result and the determination result of whether or not to be the dropped state by the drop state determination means, the setting process including a process of performing level down or level up on the output level for the carrier with respect to the previous output level in units of a predetermined variation width in a case where it is determined to be the dropped state.

5. The mobile terminal testing device according to claim 1, wherein
the output level setting means
sets a level of a next output signal by a first level setting process of lowering the output level by a step of an initial step level from a previous output level or a second level setting process of lowering a level corresponding to twice an error tolerance level from the previous output level in a case where the integrated determination result is "PASS", and
sets the level of the next output signal by a third level setting process of raising a level corresponding to ½ of a previous step level from the previous output level or a fourth level setting process of raising a level corresponding to the previous step level from the previous output level in a case where the integrated determination result is "FAIL".

6. The mobile terminal testing device according to claim 5, wherein
the reception sensitivity test execution means further includes drop state determination means for determining whether or not to be a dropped state to a preset proportion in a steep drop area related to a characteristic that a measurement result of the throughput is drops steeply, for each carrier which has not reached the measurement end condition, and
the output level setting means performs, for each carrier which has not reached the measurement end condition, a setting process of setting the output level for the carrier to be different from the previous output level according to the integrated determination result and the determination result of whether or not to be the dropped state by the drop state determination means, the setting process including a process of performing level down or level up on the output level for the carrier with respect to the previous output level in units of a predetermined variation width in a case where it is determined to be the dropped state.

7. The mobile terminal testing device according to claim 1, wherein
the reception sensitivity test execution means further includes drop state determination means for determining whether or not to be a dropped state to a preset proportion in a steep drop area related to a characteristic that a measurement result of the throughput drops steeply, for each carrier which has not reached the measurement end condition, and
the output level setting means performs, for each carrier which has not reached the measurement end condition, a setting process of setting the output level for the carrier to be different from the previous output level according to the integrated determination result and the determination result of whether or not to be the dropped state by the drop state determination means, the setting process including a process of performing level down or level up on the output level for the carrier with respect to the previous output level in units of a predetermined variation width in a case where it is determined to be the dropped state.

8. A mobile terminal testing method using a mobile terminal testing device, which performs a test of a mobile terminal that is a device under test and which includes
a signal generator that generates a test signal including a plurality of carriers, and
reception sensitivity test execution means for performing a reception sensitivity test of the device under test by setting an output level of the test signal for each time and transmitting and receiving the test signal between the signal generator and the device under test,
the mobile terminal testing method comprising:
a measurement step of measuring a throughput of the plurality of carriers transmitted and received for each time;
a determination step of determining whether or not a value of the measured throughput has reached a predetermined measurement end condition for each carrier;
an integrated determination result calculation step of, for each carrier that has not reached the measurement end condition, performing "PASS" or "FAIL" determination based on a comparison result of the value of the measured throughput and a predetermined threshold value, and calculating an integrated determination result obtained by integrating a result of each determination; and an output level setting step of setting a next output level for the carrier that has not reached the measurement end condition based on the integrated determination result, wherein the reception sensitivity test is executed for each of the plurality of carriers, in a case where any of carriers reaches the measurement end condition, the throughput measurement of the carrier ends, and the reception sensitivity test is continued for the carrier that has not reached the measurement end condition until all of the plurality of carriers reach the measurement end condition.

\* \* \* \* \*